United States Patent
Weiss et al.

(10) Patent No.: US 12,286,241 B2
(45) Date of Patent: Apr. 29, 2025

(54) EIGENMOTION CONTROL FOR NEAR RECTILINEAR HALO ORBITS

(71) Applicant: Mitsubishi Electric Research Laboratories, Inc., Cambridge, MA (US)

(72) Inventors: Avishai Weiss, Boston, MA (US); Purnanand Elango, Seattle, WA (US); Stefano Di Cairano, Newton, MA (US); Uros Kalabic, Nashua, NH (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 311 days.

(21) Appl. No.: 17/873,078

(22) Filed: Jul. 25, 2022

(65) Prior Publication Data

US 2023/0391477 A1   Dec. 7, 2023

Related U.S. Application Data

(60) Provisional application No. 63/365,813, filed on Jun. 3, 2022.

(51) Int. Cl.
*B64G 1/24* (2006.01)
*B64G 1/64* (2006.01)

(52) U.S. Cl.
CPC .......... *B64G 1/242* (2013.01); *B64G 1/244* (2019.05); *B64G 1/646* (2013.01)

(58) Field of Classification Search
CPC ....... B64G 1/242; B64G 1/244; B64G 1/646; B64G 1/105; B64G 1/2422; B64G 1/26
See application file for complete search history.

(56) References Cited

U.S. PATENT DOCUMENTS

| | | | | |
|---|---|---|---|---|
| 4,763,282 A | * | 8/1988 | Rosenberg | A61B 18/20 604/20 |
| 6,208,915 B1 | * | 3/2001 | Schutte | B64G 1/26 244/171.1 |

(Continued)

OTHER PUBLICATIONS

Folta et al. "Earth Moon Libration point orbit stationkeeping: Theory, modeling, and operat," ACTA Astronautica, Pergamon Press, Elmsford, GB. vol. 94, No. 1. Feb. 8, 2013.

(Continued)

*Primary Examiner* — Donald J Wallace
*Assistant Examiner* — Jalal C Coduroglu
(74) *Attorney, Agent, or Firm* — Gene Vinokur

(57) ABSTRACT

A computer-implemented method for maintaining a spacecraft near an orbit comprises steps of detecting that a distance from the spacecraft to the orbit is greater than a spacecraft threshold and in response, linearizing dynamics of the spacecraft from a current time over a time horizon with respect to a high-fidelity reference trajectory to produce a state transition matrix (STM) for an uncontrolled motion of the spacecraft within the time horizon. The STM includes non-expanding eigenvectors with magnitudes less than or equal to one and expanding eigenvectors with magnitudes greater than one. The method further comprises determining a control action that changes an upcoming state of the spacecraft to a linear combination of the non-expanding eigenvectors of the STM and generating a control command to an actuator of the spacecraft.

20 Claims, 18 Drawing Sheets

(56) References Cited

U.S. PATENT DOCUMENTS

| | | | | |
|---|---|---|---|---|
| 10,254,118 B2* | 4/2019 | Roumeliotis | ............. | B25J 5/00 |
| 2007/0273581 A1* | 11/2007 | Garrison | ................ | G01S 19/05 |
| | | | | 342/357.42 |
| 2008/0114564 A1* | 5/2008 | Ihara | ...................... | G06F 16/35 |
| | | | | 702/158 |
| 2021/0403182 A1* | 12/2021 | Weiss | ................... | B64G 1/6462 |
| 2022/0057440 A1* | 2/2022 | Capolino | ............... | G01R 23/02 |
| 2022/0063842 A1* | 3/2022 | Weiss | .................... | B64G 1/368 |
| 2023/0182927 A1* | 6/2023 | Vinod | ................... | B64G 1/361 |
| | | | | 244/169 |

OTHER PUBLICATIONS

Elobaid, Mohamed, et al. "Station-keeping of $L\_2$ halo orbits under sampled-data model predictive control." arXiv preprint arXiv:2202.10755 (2022).

Davis, Diane, et al. "Orbit maintenance and navigation of human spacecraft at cislunar near rectilinear halo orbits." AAS/AIAA Space Flight Mechanics Meeting. No. JSC-CN-38626. 2017.

\* cited by examiner

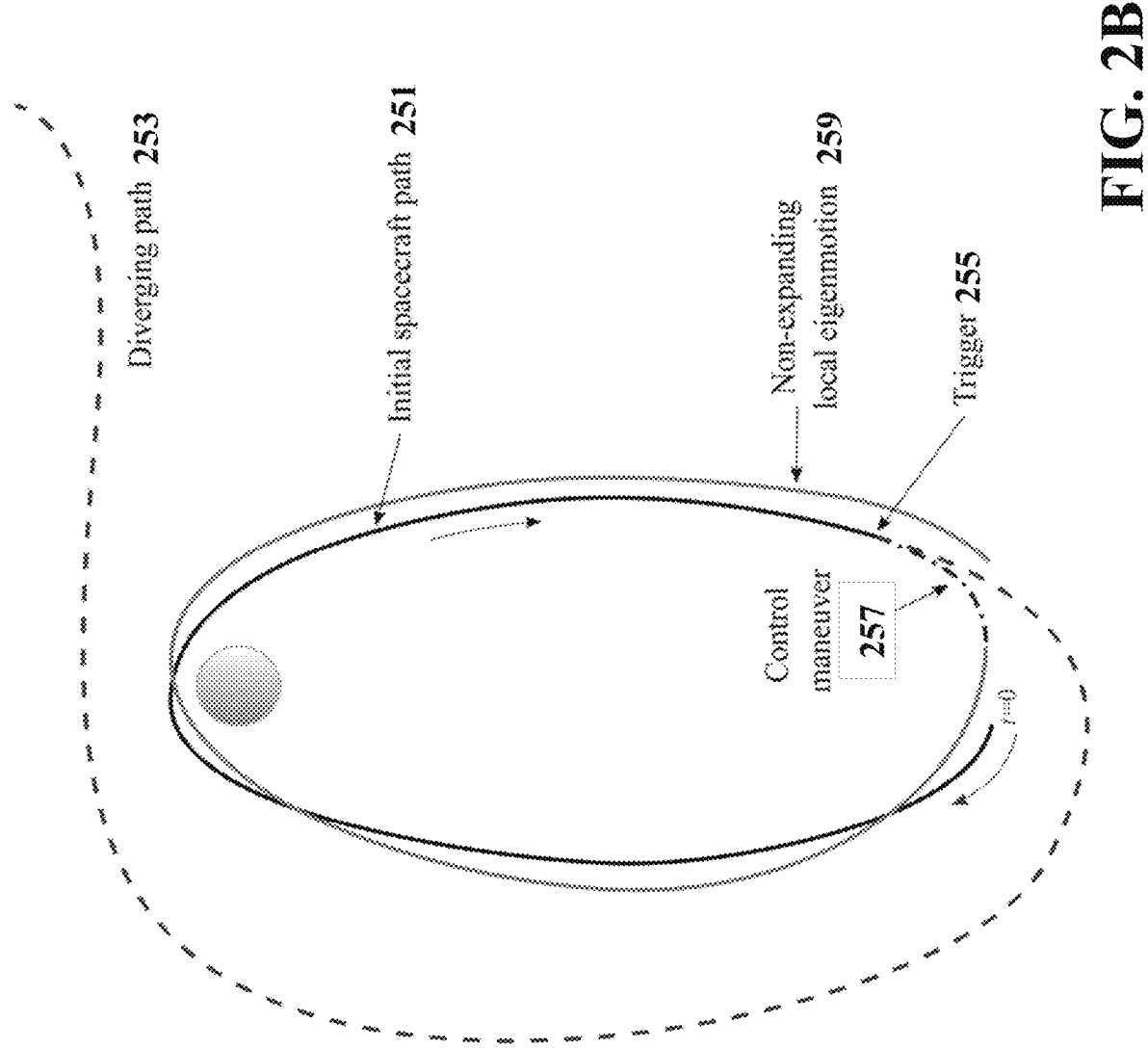

Algorithm 1 Local Eigenmotion Control

Input: $\tilde{\theta}(t), \{t_{apo}^j\}_{j=0}^K, \Delta r_0, H, \{T_N^j\}_{j=1}^K$
1: $T_H^0 \leftarrow [t_{apo}^0, t_{apo}^H]$
2: $t_0 \leftarrow t_{apo}^0$
3: $\theta \leftarrow \texttt{EigenMotion}(\Delta r_0, 0, H)$
4: $\Delta v \leftarrow 0$
5: $(l, k) \leftarrow (1, 0)$
6: while $k \leq K - 1 - H$ do
7: $\quad \tilde{\psi} \leftarrow \tilde{\theta}(t_{apo}^{k+1})$
8: $\quad T \leftarrow [t_{apo}^k, T_N^{k+1}[1]]$
9: $\quad \theta \leftarrow \texttt{Propagate}(\theta, T)$
10: $\quad T \leftarrow T_N^{k+1}[[1, N]]$
11: $\quad \theta \leftarrow \texttt{Propagate}(\tilde{\theta}, T)$
12: $\quad \Delta r_{k+1} \leftarrow \texttt{PosDev}(\theta, \tilde{\psi})$
13: $\quad$ if $\texttt{Trigger}(\Delta r_{k+1}, \Delta r_k, \Delta r_0)$ then
14: $\quad\quad T_H^{k+1} \leftarrow [t_{apo}^{k+1}, t_{apo}^{k+H+1}]$
15: $\quad\quad (U_l, \Delta v_l) \leftarrow \texttt{OptCtrl}(\tilde{\theta}, \Delta r_{k+1}, T_N^{k+1}, T_H^{k+1})$
16: $\quad\quad \theta \leftarrow \texttt{PropagateCtrl}(\tilde{\theta}, U_l, T_N^{k+1})$
17: $\quad\quad (\Delta v, \Delta r_{k+1}) \leftarrow (\Delta v + \Delta v_l, \texttt{PosDev}(\theta, \tilde{\psi}))$
18: $\quad\quad l \leftarrow l + 1$
19: $\quad$ end if
20: $\quad k \leftarrow k + 1$
21: end while
22: $M \leftarrow l - 1$

Output: $\Delta v, \{U_j, \Delta v_j\}_{j=1}^M$

FIG. 4

EIGENMOTION CONTROL FOR NEAR RECTILINEAR HALO ORBITS

FIELD

The present disclosure relates generally to controlling an operation of a spacecraft near an unstable orbit around a celestial body such as Moon, and more particularly to methods and systems for generating fuel-efficient maneuvers that leverage natural motion in order to remain near the unstable orbit for long periods of time without intervention.

BACKGROUND

Launching and deploying space stations and spacecrafts into outer space remains a challenging task till date, requiring precise analysis and study of orbital motions, celestial bodies, and other space objects. One example of such a space station is the Lunar Orbital Platform-Gateway (LOP-G), also referred to as the Gateway which is a small space station in lunar orbit intended to serve as a solar-powered communication hub, science laboratory, short-term habitation module for government-agency astronauts, as well as a holding area for rovers and other robots. The Gateway is deployable in a highly elliptical seven-day near-rectilinear halo orbit (NRHO) around the Moon and is intended to play an important role in facilitating missions in cis-lunar space and beyond. An NRHO is a type of halo orbit that has slightly curved, so near straight sides, between close passes with an orbiting body. The Gateway is deployable in proximity to an NRHO, a closed periodic trajectory in the Earth-Moon circular-restricted three-body problem (CR3BP), due to its favorable stability properties and visibility from Earth. One of the advantages of such an NRHO is the minimal amount of communications blackout with the Earth.

The Gateway is deployable near and not on an NRHO, because the NRHO of the CR3BP does not take into account perturbations such as the gravitational attraction of the Sun, solar radiation pressure (SRP), or lunar J2 effects. Instead of attempting to follow the NRHO of the CR3BP and using fuel to compensate for predictable perturbations, standard conventional practice is to solve via multiple shooting or collocation-based techniques for a high-fidelity trajectory near an NRHO that accounts for all major predictable forces in cis-lunar space. This high-fidelity solution is also referred to as an NRHO, even though it is no longer closed, periodic, nor stable. The benefit of this high-fidelity NRHO solution, however, is that in the absence of any additional perturbing forces, a spacecraft could naturally follow the trajectory without expending any fuel, which is a key performance metric to ensure the long-term viability of the Gateway.

However, two factors prevent deployment of the Gateway solely based on the high-fidelity solution. First, navigational uncertainty and unpredictable disturbance forces in the celestial space prevent the spacecraft from being deployed exactly on the computed trajectory. Second, and critically, compared to the ideal CR3BP counterpart, the trajectory is highly unstable. As a consequence, small arbitrary deviations from the solution can cause the spacecraft to diverge rapidly from the computed trajectory, and thus require stabilizing control action. These divergence issues arise with other celestial bodies as well and there is a strong possibility for spacecrafts to deviate from the planned trajectory due to several reasons.

In recent years, several station-keeping strategies have been developed for high-fidelity NRHOs. However, while the Gateway itself could make use of such control strategies, these methods cannot be directly applied to visiting spacecrafts such as for cargo resupply, human transport, or inspection and maintenance missions, which may need to perform long-term bounded, collision-free relative motion about the Gateway. While formation control for multiple spacecraft on halo orbits has been developed, for NRHO in particular, these methods propose control schemes based on the periodic solution in the CR3BP and rely on the computationally expensive process of generating a high-fidelity solution for each spacecraft in the formation.

Therefore, a need exists in the art for an improved way to control the operation of multiple spacecraft, for long-term bounded, collision-free motion near NRHO, among other aspects.

SUMMARY

The present disclosure relates to a control policy for reliable, fuel-efficient station keeping and bounded relative motion control for the Gateway and visiting spacecrafts, making use of a single precomputed high-fidelity NRHO solution while ensuring safe separation distance between spacecrafts. The high-fidelity NRHO may be referred to as a reference trajectory, a high-fidelity reference trajectory, a baseline, a baseline solution, and a baseline reference trajectory, throughout the disclosure.

To develop some of the embodiments of the present disclosure there were assumptions and realizations that assisted in their development. At least one realization included that the control policy shall utilize the linear approximation of the spacecraft dynamics in the vicinity of the high-fidelity NRHO.

Although small deviations from a state on the high-fidelity NRHO trajectory will generally lead to rapid divergence, some example embodiments are based on the realization that at any given time instance there exists some special states in the vicinity of the reference trajectory which yield desirable non-diverging natural motion, where natural motion means motion without control (i.e., without using fuel/onboard power). These states form a desirable space around the reference trajectory. If the spacecraft is controlled to this space instead of controlling to the orbit itself, the requirement is relaxed from staying exactly on the orbit to staying "near" the orbit, which trades off distance to the orbit for increased fuel efficiency. That is, instead of continuously controlling the spacecraft to stay on the intended orbit which would lead to significant fuel/onboard power consumption, the proposed control policy aims to keep the spacecraft within the desirable space where the desirable non-diverging natural motion is possible, thus leading to significant increase in fuel efficiency.

Some example embodiments are also based on the realization that the region of such special states (subspace) may be estimated using local modal decompositions of receding-horizon state transition matrices (STMs) associated with the high-fidelity reference trajectory. In other words, the orbital dynamics about the reference trajectory over a user determined finite horizon may be linearized and an eigenvalue decomposition of the resulting linearized STMs may be used. A state-transition matrix is used to find the solution to a general state-space representation of a linear system described in the following form $\dot{x}(t)=A(t)x(t)+B(t)u(t)$, $x(t_0)=x_0$, where $x(t)$ are the states of the system, $u(t)$ is the input signal, $A(t)$ and $B(t)$ are matrix functions, and $x_0$ is the initial condition at $t_0$. The state transition matrix $\Phi(t, \tau)$ for such a system may be used to give a solution as $x(t)=\Phi(t, t_0)x(t_0)+$ $\int_{t_0}^{t} \Phi(t, \tau)B(\tau)u(\tau)d\tau$, where the first term is known as the zero-input response and represents how the system's state would evolve in the absence of any input. The second term is known as the zero-state response and defines how the inputs impact the system. Thus, the STM provides the states of the system.

At this point it is important to understand that a (nonzero) vector v of dimension N is an eigenvector of a square N×N matrix A if it satisfies a linear equation of the form $Av=\lambda v$ for some scalar $\lambda$. Then $\lambda$ is called the eigenvalue corresponding to the eigenvector v. The special states that exhibit desirable natural motion arise from eigenvectors of the STMs with eigenvalues that have magnitude less than 1. This is because for such states wherein the eigenvalues have magnitude less than 1, the solution provided by the STM is closer to the baseline solution (i.e. converges towards the reference trajectory).

The natural motion resulting from an initial condition along an eigenvector of an STM is termed local eigenmotion. The natural motion that results from an initial condition along the expanding (eigenvalue>1) and non-expanding (eigenvalue<=1) eigenvectors of an STM is termed as expanding and non-expanding local eigenmotion, respectively.

Another realization of some example embodiments included that these eigenvectors are directions without a fixed magnitude. This means that the spacecraft can move to these directions at various distances from the reference trajectory and exhibit the type of eigenmotion that is desired. Some example embodiments utilize the distance to the reference trajectory as a trigger condition to determine when to apply control, because at any spacecraft distance from the reference trajectory the spacecraft may be controlled to move from a currently undesirable diverging state to a desirable state in the non-expanding subspace.

It is a realization of some example embodiments that whenever divergence from the vicinity of the reference trajectory is detected, the eigenmotion-based control solves a nonlinear optimization problem to find one or more fuel-efficient maneuvers (also referred to as control actions) that transfers the spacecraft to the set of states that yield desirable natural motion. The nonlinear optimization is a finite horizon optimization of a dynamics model of the spacecraft, a set of objectives of the motion of the spacecraft, and constraints on the spacecraft propulsion system and motion, and has the ability to anticipate future events to take appropriate control actions.

The one or more fuel-efficient maneuvers may be achieved by optimizing the operation of the spacecraft according to the set of objectives, over a future finite time-horizon with prediction obtained according to the model of the spacecraft subject to constraints. The constraints may represent, for example, physical limitation of the spacecraft, safety limitations on the operation of the spacecraft, and performance limitations on a trajectory of the spacecraft. In some non-limiting examples, the constraints on the spacecraft propulsion system may include constraints on the inputs to the thrusters that define a range of rotations of the thrusters. A control strategy for the spacecraft is admissible when the motion generated by the spacecraft for such a control strategy satisfies all the constraints.

In theory, it is possible to use a nonlinear optimal control to obtain the optimal station-keeping maneuver for the entire duration of the spacecraft mission, rather than over a finite time-horizon. However, that creates a very large optimization problem, and results in a very high computational burden which may not be able to be implemented in the computational resource constrained hardware in spacecrafts. As such, some example embodiments are based on a realization that by using local eigenmotion-based control, the spacecraft is able to use natural motion for long durations, which reduces the computational burden of and speeds up the solving of the optimization problem.

It is a further realization that the use of a trigger-based control allows the spacecraft to control infrequently, because the spacecraft can follow natural motion for extended periods of time until it begins to diverge from the reference trajectory beyond the trigger threshold, at which point there exists a nearby desirable state in the subspace that can maneuvered to. Owing to the infrequent control of the spacecraft, the number of times thrusters are activated is greatly reduced which again leads to increase in fuel efficiency over a period of time.

In some example embodiments, the distance from the reference trajectory is a tunable parameter allowing control of multiple spacecrafts with respect to each other without having to compute reference trajectories for each spacecraft independently. The multiple spacecraft, the planet(s) which they orbit, and their orbits, form a multi-object celestial system. In other words, the same subspace associated with a single reference trajectory is used, but at different distances from the reference trajectory, which is sufficient to guarantee the difference of trajectories for the multiple spacecrafts. Therefore, in scenarios where a host spacecraft is visited by a visitor spacecraft for some reason, the same reference trajectory of the host spacecraft may be utilized. As such, since the example embodiments utilize the distance between the spacecraft and the baseline solution (reference trajectory) as a trigger to the control policy, the approach is applicable for controlling any number of spacecrafts in addition to the Gateway.

In some example embodiments, the special eigenvector direction states are combined in a linear combination to achieve a mixed state with natural motion that is a combination of the corresponding eigenmotions. For example, controlling the spacecraft to a combination of eigenvectors with eigenvalues strictly less than 1, yields natural motion of the spacecraft to converge toward the reference trajectory. In contrast, including eigenvector directions with magnitude near 1 in the linear combination, yields natural motion that is oscillatory at the current distance from the reference trajectory. Selecting particular combinations of eigenvector directions for the spacecraft to transition to allows the operator to shape the natural motion of the spacecraft near the reference trajectory, moving the spacecraft closer to or further away from the reference trajectory as desired.

According to one non-limiting embodiment, the spacecraft is actuated by eight thrusters, each mounted in a manner aligned with the center of mass of the spacecraft so that they produce forces to change the position of the spacecraft while producing no torques to rotate the spacecraft.

Towards these ends, some example embodiments provide controllers, methods, and programs for maintaining spacecrafts near a desired orbit. Some example embodiments provide important solutions to control the operation of multiple spacecraft, for long-term bounded, collision-free motion near NRHO for missions that perform satellite servicing, active debris mitigation, in-space manufacturing, space station resupply, and planetary sample return.

Accordingly, one embodiment discloses a controller for maintaining a spacecraft near an orbit. The controller includes memory having instructions stored thereon and a processor configured to execute the instructions to cause the controller to detect that a distance from the spacecraft to the orbit is greater than a spacecraft threshold. In response to detecting that the distance from the spacecraft to the orbit is greater than a spacecraft threshold, the processor is further configured to linearize dynamics of the spacecraft at a current state over a time horizon with respect to a high-fidelity reference trajectory to produce a state transition matrix (STM) for an uncontrolled motion of the spacecraft within the time horizon. The STM includes non-expanding eigenvectors with magnitudes less than or equal to one and expanding eigenvectors with magnitudes greater than one. The processor is further configured to determine a control action that changes an upcoming state of the spacecraft to a linear combination of the non-expanding eigenvectors of the state transition matrix. The processor is further configured to generate a control command to an actuator of the spacecraft causing correction of the upcoming state of the spacecraft along a direction corresponding to at least one of the non-expanding eigenvectors of the state transition matrix.

Another embodiment discloses a computer-implemented method for maintaining a spacecraft near an orbit comprises steps of detecting that a distance from the spacecraft to the orbit is greater than a spacecraft threshold. In response to detecting that the distance from the spacecraft to the orbit is greater than the spacecraft threshold, dynamics of the spacecraft at a current state are linearized over a time horizon with respect to a high-fidelity reference trajectory to produce a state transition matrix for an uncontrolled motion of the spacecraft within the time horizon. The state transition matrix includes non-expanding eigenvectors with magnitudes less than or equal to one and expanding eigenvectors with magnitudes greater than one. The method further comprises determining a control action that changes an upcoming state of the spacecraft to a linear combination of the non-expanding eigenvectors of the state transition matrix, and generating a control command to an actuator of the spacecraft causing correction of the upcoming state of the spacecraft along a direction corresponding to at least one of the non-expanding eigenvectors of the state transition matrix.

Yet another embodiment discloses a non-transitory computer readable storage medium having embodied thereon a program executable by a processor for performing a method for maintaining a spacecraft near an orbit. The method comprises detecting that a distance from the spacecraft to the orbit is greater than a spacecraft threshold. In response to detecting that the distance from the spacecraft to the orbit is greater than the spacecraft threshold, dynamics of the spacecraft at a current state are linearized over a time horizon with respect to a high-fidelity reference trajectory to produce a state transition matrix for an uncontrolled motion of the spacecraft within the time horizon. The state transition matrix includes non-expanding eigenvectors with magnitudes less than or equal to one and expanding eigenvectors with magnitudes greater than one. The method further comprises determining a control action that changes an upcoming state of the spacecraft to a linear combination of the non-expanding eigenvectors of the state transition matrix, and generating a control command to an actuator of the spacecraft causing correction of the upcoming state of the spacecraft along a direction corresponding to at least one of the non-expanding eigenvectors of the state transition matrix.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2B is a schematic illustrating a representation of a maneuver that transfers the spacecraft to a non-expanding local eigenmotion at apolune when the trigger condition is satisfied, according to some example embodiments;

FIG. 4 illustrates an algorithm associated with local eigenmotion control, according to some example embodiments;

Figure 1A:
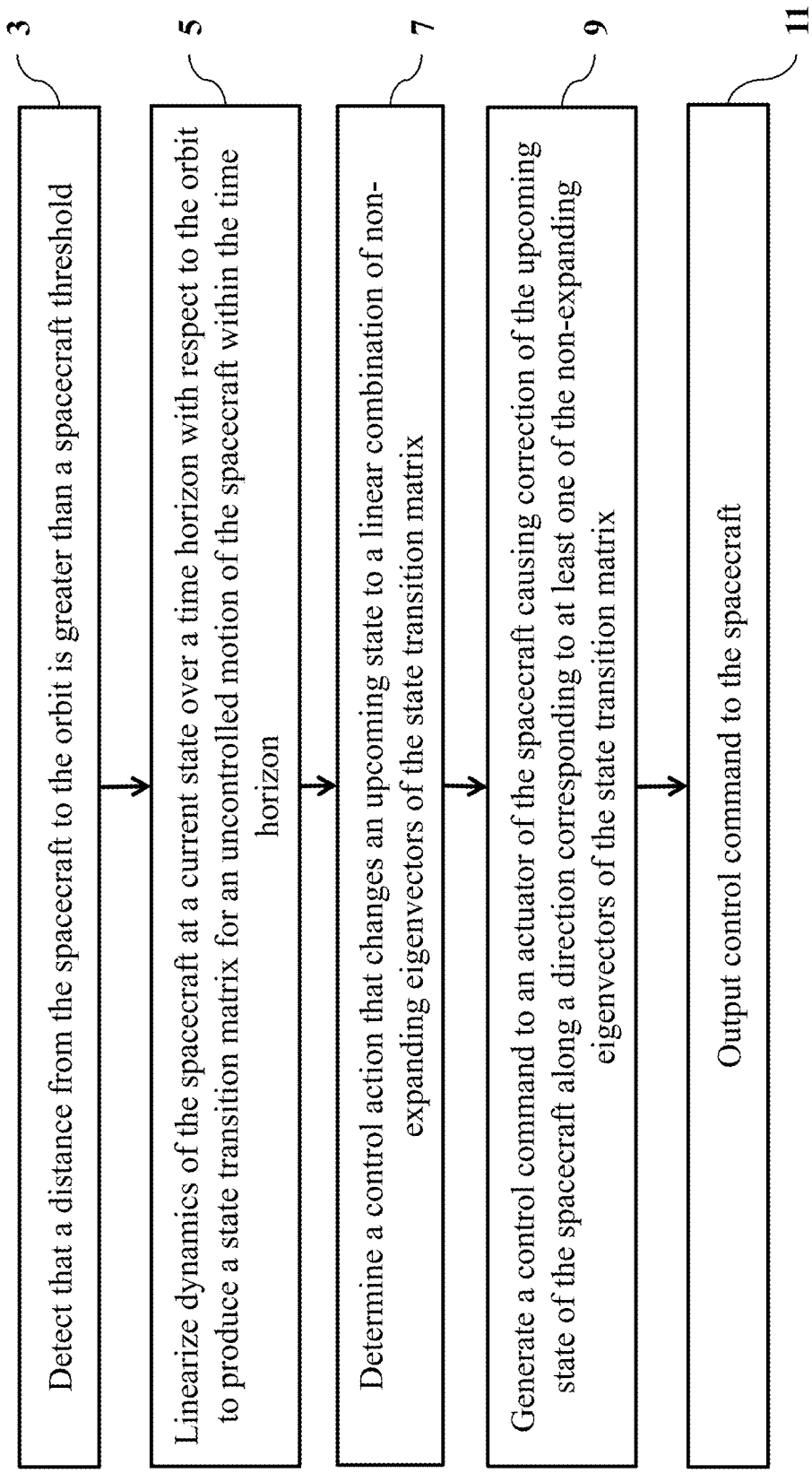
FIG. 1A is a block diagram illustrating some method steps for eigenmotion maneuver design that produces fuel-efficient station keeping and bounded relative motion control for a spacecraft, according to some example embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The deployment of spacecrafts and space stations into an orbit around a celestial body is a challenging task that requires reliable, low-cost strategies for station keeping and relative motion tailor-made for such special orbits. One example of such a deployment is when visiting spacecrafts are required to be deployed around the Lunar Orbital Platform-Gateway (LOP-G), also referred to as the Gateway and is planned to be deployed in a highly elliptical seven-day near-rectilinear halo orbit (NRHO) around the Moon. In the context of deployment of such spacecrafts, it is desirable to have natural uncontrolled motion as much as possible in order to cut on fuel consumption and frequent replenishing of onboard energy. Several factors prevent or deter attempts to deploy the spacecrafts into a region near the NRHO. As such, small arbitrary deviations from the solution cause the spacecraft to diverge rapidly from the computed trajectory, and thus require stabilizing control action.

Example embodiments disclosed herein provide a control approach which harnesses the eigenvectors of state transition matrices (STM) associated with a high-fidelity NRHO solution in the ephemeris model to design long-term station keeping and bounded relative motion. The proposed strategies effectively utilize the natural motion of the spacecraft so that control actions are infrequent and fuel efficient. This ensures that the spacecrafts are able to exhibit long-term bounded, collision-free relative motion about the Gateway. Furthermore, since the proposed strategies do not involve any periodic solution or compute high-fidelity solution for every spacecraft, the approaches on which some example embodiments are based upon, are computationally efficient, inexpensive and scalable while being fast and result in enhanced energy efficiency for the spacecrafts.

In this regard, example embodiments make use of a single precomputed high-fidelity NRHO solution while ensuring safe separation distance between spacecrafts. Some example embodiments exploit some special states in the vicinity of the reference trajectory which yield desirable non-diverging natural motion. These states form a desirable space around the reference trajectory. If the spacecraft is controlled to this space instead of controlling to the orbit itself, the requirement is relaxed from staying exactly on the orbit to staying "near" the orbit, which trades off distance to the orbit for increased fuel efficiency. In order to determine these special states, some example embodiments are directed towards local modal decompositions of receding-horizon state transition matrices (STMs) associated with the high-fidelity reference trajectory. In order to prevent unnecessary or undesired control of the spacecraft which may lead to undue energy consumption, some example embodiments utilize a trigger condition to determine when to execute the control law/policy. The trigger condition is based on a distance of the spacecraft from the reference trajectory. The use of a trigger-based control allows the spacecraft to perform control infrequently. This is because the spacecraft can follow natural motion for extended periods of time until it begins to diverge from the reference trajectory beyond the trigger threshold, at which point there exists a nearby desirable state in the subspace that can maneuvered to.

Another advantage of the control approach provided by various example embodiments is that the proposed strategies allow control of multiple spacecrafts with respect to each other (collision avoidance) without the need to separately compute a reference trajectory for each of them. The same subspace of special states associated with one single reference trajectory may be used for every spacecraft at different distances from the single reference trajectory.

In this way, some example embodiments of the present disclosure provide important solutions to control the operation of multiple spacecraft, for long-term bounded, collision-free motion near NRHO for missions that perform satellite servicing, active debris mitigation, in-space manufacturing, space station resupply, and planetary sample return. Further, proximity operations are an important process of accomplishing mission objectives and are a key technology for space exploration. In fact, the systems and methods of the present disclosure can be applied for several purposes such as, but not limited to, satellite servicing, orbital debris removal, in-space manufacturing, space station re-supply, and planetary science sample return missions.

These and several other advantages will be evident from the following detailed description of example embodiments of the proposed control strategies. While some example embodiments are described with reference to the orbit of the moon, it may be contemplated that the proposed control strategies are applicable to any multi-object celestial system. As such, example embodiments described herein are not to be limited to the lunar celestial system which is referred to only for exemplary purposes. The scope of the proposed control strategies encompasses situations and systems pertaining to any multi-object celestial system.

FIG. 1A is a block diagram illustrating some method steps for eigenmotion maneuver design that produces fuel-efficient station keeping and bounded relative motion control, according to some example embodiments. In particular, the described method steps concern any system and method for controlling an operation of a spacecraft over a finite time horizon.

In some example embodiments, a spacecraft may be directed towards orbiting a central body such as a celestial body. The spacecraft may do so by performing orbital motions by itself or by deployment about a space station orbiting the central body. In this regard the spacecraft may be equipped with capabilities to ascertain or obtain a current state of the spacecraft within a specified time period. A state of the spacecraft may include data pertaining to one or combination of positions, and translational velocities of the spacecraft, and perturbations acting on a multi-object celestial system of which the spacecraft is a part. A check regarding whether a distance of the spacecraft to the orbit is greater than a spacecraft threshold may be performed. If the distance is greater than or in some case equal to the spacecraft threshold, it corresponds to a situation where the spacecraft may be diverging or in some cases start diverging from the desired orbit in any direction. As such, it is desired that an immediate control action may be performed to steer the spacecraft back to a path on or along the desired orbit. Thus, the condition where it is detected 3 that the distance of the spacecraft to the orbit is greater than a spacecraft threshold, may be utilized as a trigger to execute the control policy to prevent the spacecraft from diverting from the desired orbit.

Upon detecting that the trigger condition at step 3 of FIG. 1A is met, a controller at step 5 of FIG. 1A may linearize dynamics of the spacecraft at a current state over a time horizon with respect to a high-fidelity reference trajectory to produce a state transition matrix (STM) for an uncontrolled motion of the spacecraft within the time horizon. In some example embodiments, the high-fidelity reference trajectory may be precomputed and stored in a storage such as a database that is accessible to the controller. In some other example embodiments, the reference trajectory may be dynamically computed at run time. The linearization of the dynamics of the spacecraft may be performed over discrete time instances and the state transition matrix may be obtained directly.

In some example embodiments, the time horizon is a finite time horizon and the specified time period during which the current state of the spacecraft is ascertained may overlap with the finite time horizon. In some example embodiments, the specified time period may be outside the finite time horizon.

The linearization of the orbital dynamics of the spacecraft about the high-fidelity reference trajectory is followed by an eigenvalue decomposition of the resulting linearized STM to identify a region of special states in the vicinity of the reference trajectory (subspace). The special states may be states which yield desirable non-diverging natural motion. Throughout the disclosure, natural motion or uncontrolled motion may mean motion of the spacecraft without control (i.e., without using fuel or onboard power). The resulting STM includes non-expanding eigenvectors with magnitudes less than or equal to one and expanding eigenvectors with magnitudes greater than one. In some example embodiments, the special states that exhibit desirable natural motion arise from eigenvectors of the STMs with eigenvalues that have magnitude less than one.

Step 7 of FIG. 1A includes determining a desired control action to achieve a state that is a linear combination of non-expanding eigenvectors of the state transition matrix. If the spacecraft were to follow its computed trajectory and it is detected that there will be divergence from the desired orbit in an upcoming state, the controller needs to perform correction maneuvers for the upcoming state. In this regard, the controller determines a control action that changes the upcoming state corresponding to a linear combination of non-expanding eigenvectors of the STM.

Step 9 of FIG. 1A includes generating one or more control commands to activate or not activate one or more thrusters of the vehicle for the specified time period based on the control commands to achieve the desired correction maneuver. The control commands are intended to cause correction of the upcoming state of the spacecraft along a direction corresponding to at least one of the non-expanding eigenvectors of the STM. The generated control commands are outputted at step 11 to an interface of the spacecraft for further action. In some example embodiments, the controller may be embodied on the spacecraft itself and as such, at step 11 the controller may directly provide the control commands to an actuator (propellers and/or thrusters) of the spacecraft to achieve the desired correction maneuvers. In some example embodiments, the controller may be remotely in communication with the spacecraft, and as such the control commands may be transmitted to the spacecraft and the spacecraft's onboard CPU may process the control commands accordingly to achieve the desired correction maneuvers.

Figure 1B:
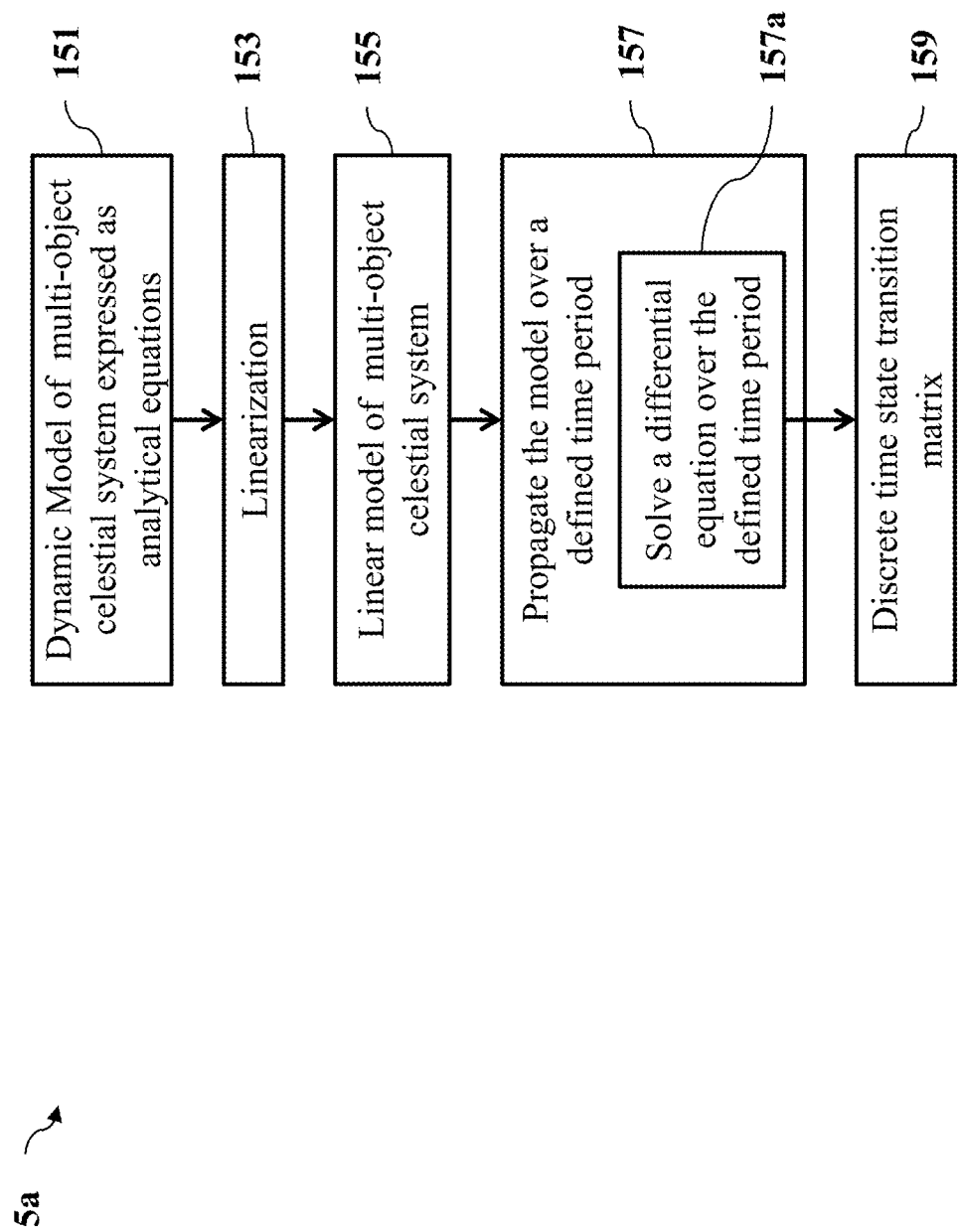
FIG. 1B illustrates a flowchart of some steps for determining a state transition matrix for an uncontrolled motion of the spacecraft, according to some example embodiments.

FIG. 1B illustrates a flowchart 5a of some steps for determining a state transition matrix for an uncontrolled motion of the spacecraft, according to some example embodiments. The dynamic Model of a multi-object celestial system may be obtained 151. The multi-object celestial system may comprise the spacecraft and at least one celestial object. The dynamic model may be expressed as analytical equations. Since the dynamic model may be non-linear, it may be linearized in the next step at 153 to obtain a Linear model of the multi-object celestial system 155. This may present a continuous time analytical equation for the linearization and to obtain the state transition matrix the discrete time matrix may be required. As a part of the steps leading to the state transition matrix, the flowchart 5a comprises propagating 157 the linearized model over a defined period of time. For example, the defined period of time may span an entire duration of the baseline. In this regard, a differential equation (such as differential equation 11 described later) may be solved 157a over the defined period of time to obtain the discrete time state transition matrix 159.

Figure 1C:
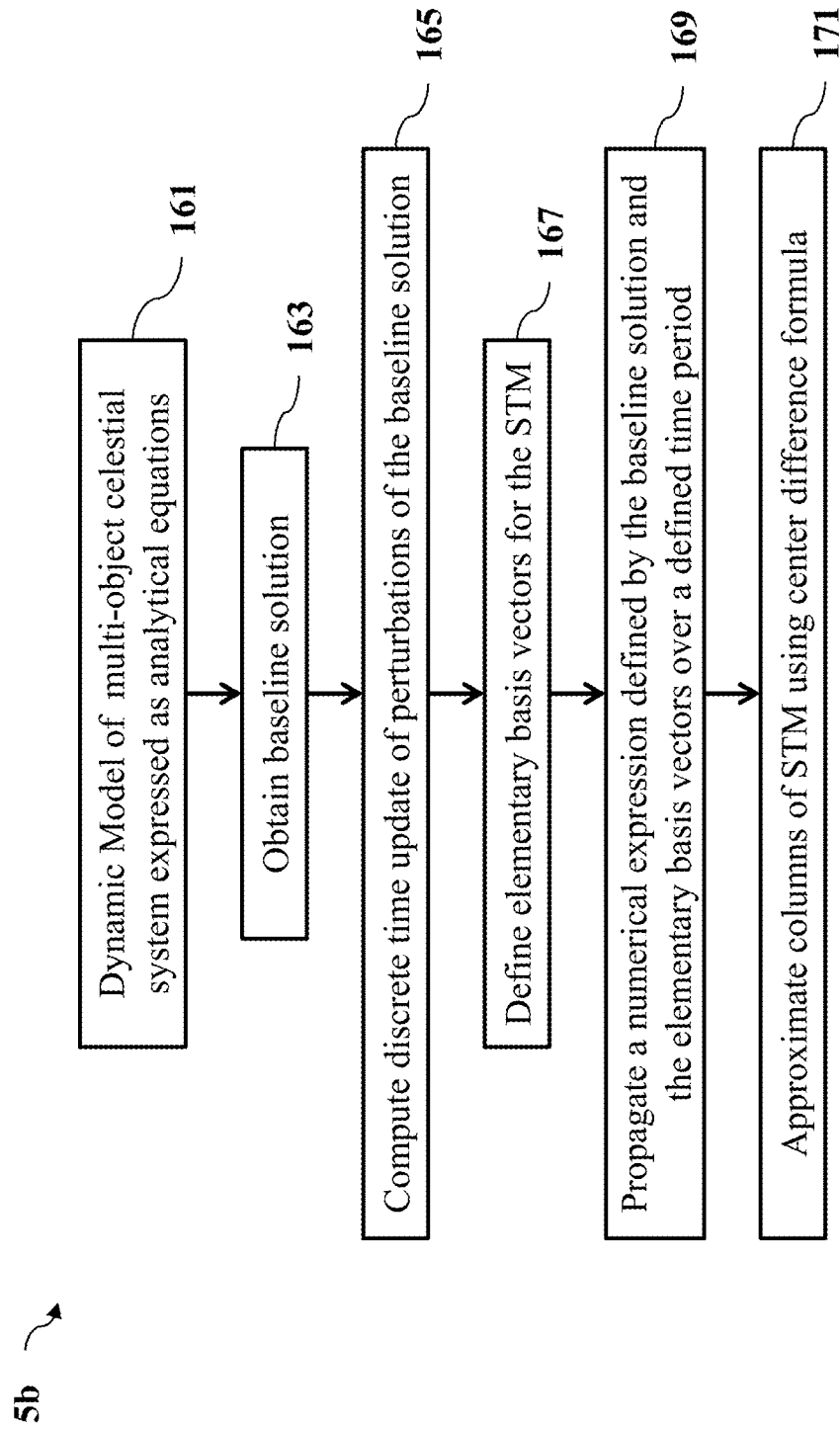
FIG. 1C illustrates another flowchart of some steps for determining a state transition matrix for an uncontrolled motion of the spacecraft, according to some example embodiments.

FIG. 1C illustrates another flowchart 5b of some steps for determining a state transition matrix for an uncontrolled motion of the spacecraft, according to some example embodiments. At 161, the dynamic Model of the multi-object celestial system expressed as analytical equations may be obtained. A baseline solution also referred to as the reference trajectory may also be obtained 163. The discrete-time update for perturbations of the baseline solution may be computed 165. For example, let r(t) denote a solution, which in some example embodiments may be a baseline solution. The discrete-time update for perturbations of r(t) may be computed, i.e. given a time $t_h$ and a perturbed state $\tilde{r}(t)=r(t)+\delta r(t)$, where $\delta r(t)$ denotes a relative state relative to r, it is an objective to find a local linear map (a state transition matrix) $\Phi(t, t+t_h)$ such that $\tilde{r}(t+t_h)-r(t+t_h) \approx \Phi(t, t+t_h) \delta r(t)$.

The flowchart 5b further comprises defining 167 elementary basis vectors for the STM. To compute $\Phi(t, t+t_h)$ numerically, it is defined that $e_i$ be the elementary basis vector where the i-th element of $e_i$ is equal to 1 and let $\varepsilon > 0$ be a small parameter. Next, a numerical expression defined by the baseline solution r(t) and the elementary basis vectors is propagated 169 over a defined time period. For example, the exressions $r(t)+\varepsilon e_i$ and $r(t)-\varepsilon e_i$ may be propagated from t to $t+t_h$ numerically and the solutions at time $t+t_h$ may be referred to as $\tilde{r}_i^+$ and $\tilde{r}_i^-$, respectively. Then, the i-th column of the STM $\Phi(t, t+t_h)$ may be approximated 171 by the center difference formula:

$$\tilde{r}_i^+ - \tilde{r}_i^- \frac{\tilde{r}_i^+ - \tilde{r}_i^-}{2\varepsilon}$$

In this way, the STM may be obtained numerically with lesser computations thereby leading to improved fuel efficiency.

Figure 1D:
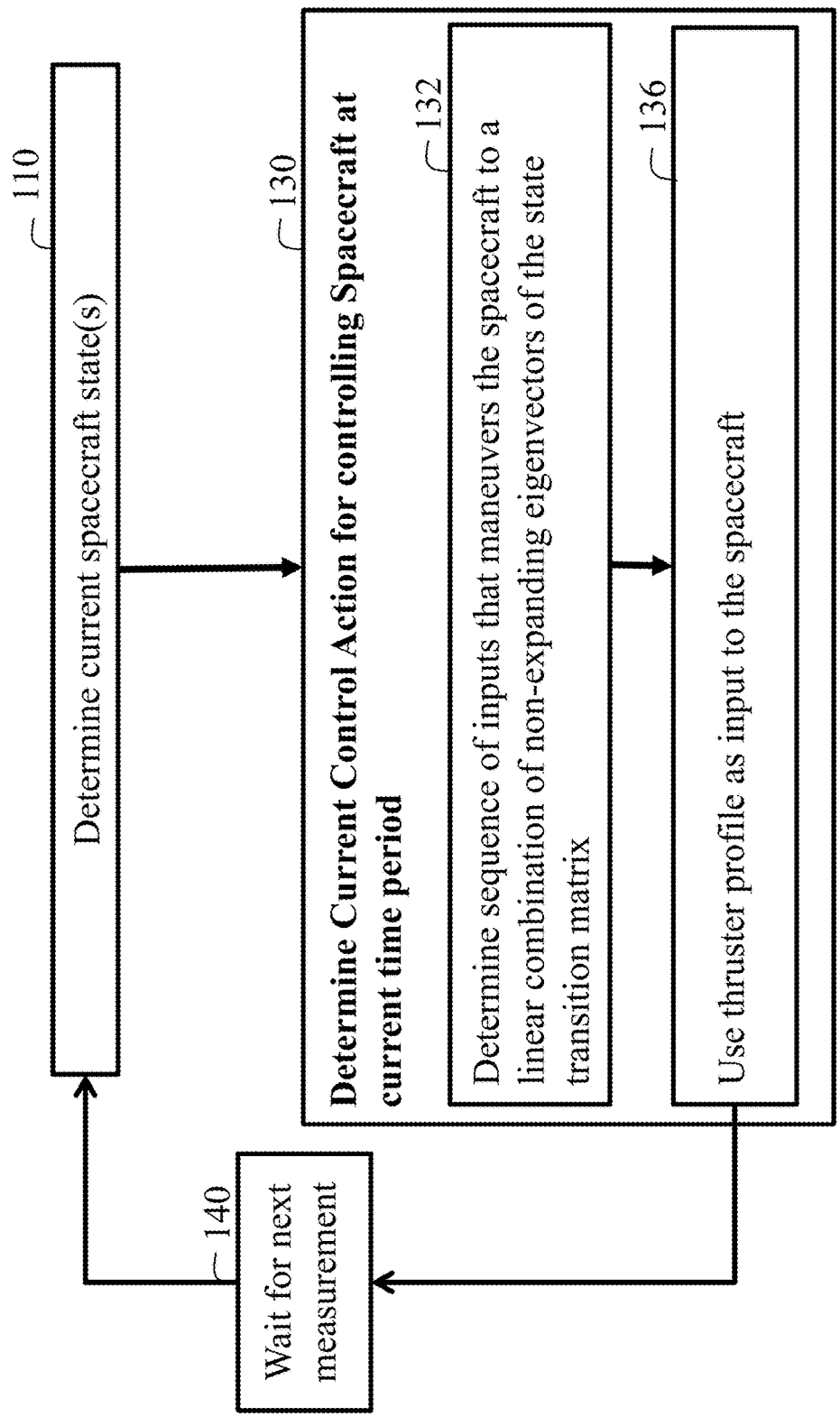
FIG. 1D is a block diagram illustrating a method for controlling an operation of a spacecraft that stays within some bounds of a reference trajectory, according to some example embodiments.

FIG. 1D is a block diagram illustrating a method for controlling an operation of a spacecraft that stays within some bounds of a reference trajectory, according to some embodiments of the present disclosure. For example, the method controls the operation of the spacecraft with control inputs determined using a model of the joint multi-object celestial system based on an optimization of a cost function having an objective function of minimizing fuel/onboard power consumption.

An initial step 110 of FIG. 1D includes determining the current state(s) of the spacecraft, of which, the current state(s) of the spacecraft can be determined using sensors, or other aspects such as hardware or software. In addition, or in alternate, the current state(s) of the spacecraft may be obtained from communication with a ground command center located on Earth or another spacecraft located in outer space, e.g. GPS, relative range measurements, star trackers, horizon sensors, or the like. In some example embodiments, the current spacecraft state(s) may be determined based on a previous control input determined for a previous iteration that is optimized with a previous cost function using a previous model of the spacecraft. As used herein, the state(s) include one or combination of positions, and translational velocities of the spacecraft, and perturbations acting on the multi-object celestial system. Still referring to FIG. 1D, the state(s) determined in step 110 may be absolute state(s) relative to the central body that the spacecraft(s) is/are orbiting.

Step 130 of FIG. 1D determines a current control action/input for controlling the spacecraft at the current time period using the current model of the joint multi-object celestial system dynamics. In this regard, the current model of the joint multi-object celestial system dynamics may be fetched from a database or other storage accessible by a controller implementing the method of FIG. 1D. In some example embodiments, the current model of the joint multi-object celestial system dynamics may be generated based on dynamics data of the spacecraft, the central body around which the spacecraft is orbiting and/or other objects and bodies around the spacecraft.

At step 132 of FIG. 1D, the method uses the current model of the joint multi-object celestial system dynamics to determine a sequence of future inputs of thruster forces from the current time instant for a fixed amount of time in the future, so long as to at least obtain new state measurements so that, the predicted future spacecraft state(s) and input(s) satisfy the constraints on the operation of the spacecraft and constraints on the control inputs. For example, the sequence of future inputs to thruster forces may comprise forces that lead to a new future state at or in which the spacecraft is no longer diverging from the desired orbit.

Step 136 of FIG. 1D, uses the thruster profile as an input to the spacecraft. Using this profile the future inputs may be applied to the spacecraft.

At step 140 of FIG. 1D, based on the determined current state(s) of the spacecraft in step 110 and the determined current control input step 130 to the spacecraft, a next state(s) of the spacecraft is/are determined, and at step 140, the controller waits until a new state measurement is received. The control of steps than passes back to step 110 for the next iteration and the process is repeated.

Figure 1E:
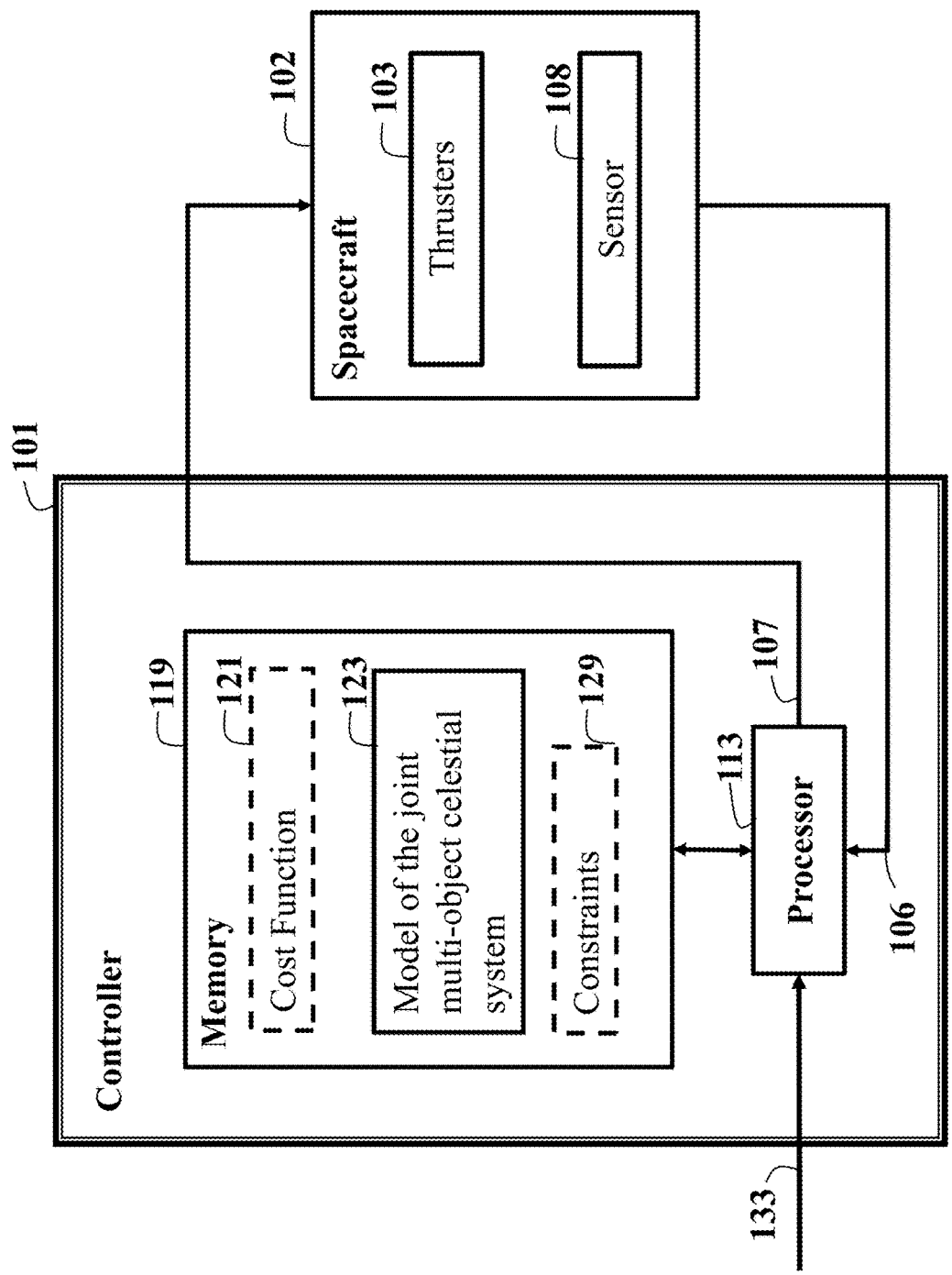
FIG. 1E is a block diagram illustrating some components of a controller for maintaining a spacecraft near an orbit, according to some example embodiments.

FIG. 1E is a block diagram illustrating some components of a controller implementing at least some steps of the method of FIG. 1A and FIG. 1D, according to some embodiments of the present disclosure. The method of FIG. 1D, may include a control system or controller 101 that has at least one processor 113 for executing modules of the controller. The controller 101 may be in communication with a processor 113 and a memory 119. The memory may have stored thereon instructions and data including the cost function 121, the joint multi-object celestial system model 123, and constraints 129.

Further, the method of FIG. 1D can determine control inputs 107 via the processor 113, using the model of the joint multi-object celestial system 123 subject to the constraints 129. In some example embodiments, the determined control inputs 107 may be sent to the spacecraft 102. To that end, the controller 101 may included or be operatively connected to an output interface configured to submit the control commands 107 to the thrusters 103 of the spacecraft 102. Further the spacecraft 102 may have thrusters 103 and sensors 108, among other components. The current state 106 of the spacecraft 102 may be obtained from the sensors 108 and communicated to the processor 113.

Still referring to FIG. 1E, in some example embodiments, the processor 113 may determine at least one of the cost function 121, the joint multi-object celestial system model 123, the constraints 129 during the control. For example, the controller 101 may execute a method, such as the method of FIG. 1D, to control iteratively the operation of the spacecraft 102 with control inputs of step 130 of FIG. 1D determined using the model 123 of the joint multi-object celestial system, based on an optimization of the cost function 121. It is contemplated that method of FIG. 1D may also be executed by the controller 101 based on a previously iterative operation of the spacecraft 102, i.e. from a previously iterative control operation having a previous control input determined for a previous iteration that is optimized by a previous cost function using a previous model of the spacecraft 102.

Figure 2A:
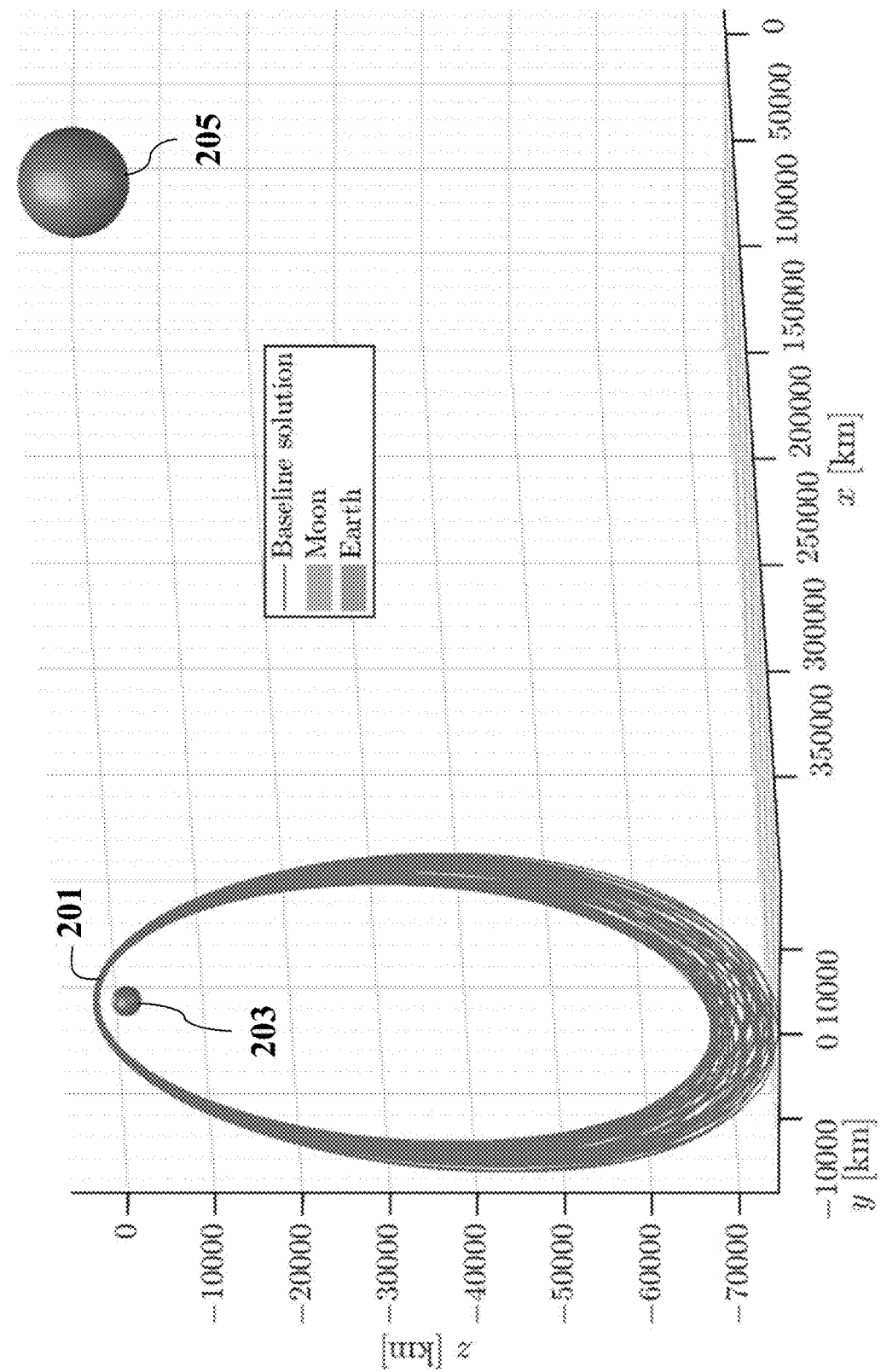
FIG. 2A is a schematic illustrating a representation of a high-fidelity reference trajectory, also referred to as a baseline solution, according to some example embodiments.

FIG. 2A is a schematic illustrating a representation of a high-fidelity reference trajectory, according to some example embodiments. The exemplar high-fidelity reference trajectory illustrated in FIG. 2A may also be referred to as a baseline NRHO solution 201, The baseline NRHO solution 201 (represented in the Earth-Moon rotating frame) may consist of 60 revolutions around the Moon over 394 days. Referring to FIG. 2A, the Moon is shown labeled as 203 and the Earth is shown labeled as 205.

Hereinafter, a few concepts pertaining to spacecraft control will be described next. Near rectilinear halo orbits (NRHO) are periodic trajectories around the L1 and L2 Lagrange points of the Earth-Moon circular restricted three-body problem (CR3BP). Owing to their favorable stability properties and relatively low station-keeping cost, the NRHO about the L2 point with 9:2 synodic resonance and perilune radius of about 3150 kin has been chosen for deploying the Gateway. However, NRHOs don't exist in reality since the CR3BP ignores solar radiation pressure (SRP), gravitational forces due to celestial bodies other than Earth and Moon, and effects like lunar J2 zonal harmonics. Ignoring these higher order effects during mission design would lead to an unacceptably high amount of fuel consumption. Thus, a high-fidelity astrodynamics model with ephemeris data is used in practice to generate a solution which is closest to the NRHO in the CR3BP. This high-fidelity solution is aperiodic and consists of a finite number of revolutions around the Moon. The astrodynamics model considered in some example embodiments accounts for all major predictable forces acting on a spacecraft in cis-lunar space. Any major predictable force has magnitude larger than that of the largest unpredictable force. For the model considered here, the largest unpredictable force influencing a spacecraft is determined to be the indirect disturbance caused by navigation error feeding into the spacecraft's controller. The navigation error is quantified under the assumption that the spacecraft state is estimated using measurements from the Deep Space Network (DSN). Under these assumptions, the major predictable forces acting on a spacecraft in the region of space occupied by the NRHO of the CR3BP are SRP, lunar J2 zonal harmonics, and gravitational forces due to the Earth, Moon and Sun.

Notation: Let the set of natural numbers be represented as $\mathbb{N}$ and the set of real numbers be represented by $\mathbb{R}$. All vectors are column vectors. A real vector of length $n \in \mathbb{N}$ belongs to the set represented by $\mathbb{R}^n$. Vectors are represented as comma separated list of elements enclosed in [•]. A vector with two elements [a, b] with real numbers a and b such that a≤b also represents a closed interval on the real line. Similarly, (a, b) denotes an open interval. A vector constructed by vertically stacking two vectors c and d can be compactly represented as $[c^T d^T]^T$. The vector of length n containing zeros is denoted by $0_n$. The kth element of a vector θ of length n≥k is denoted by θ[k]. Given a matrix Θ with n≥k rows and m≥k columns, row k is denoted by Θ[k,:], while column k is denoted by Θ[:, k]. If κ is a vector consisting of elements from {1, ..., n}, then θ[κ] is a vector of elements of θ indexed by the elements in the vector κ. Similarly, Θ[:,κ] and Θ[κ,:] are matrices composed of columns and rows of $\Theta$, respectively, indexed by the elements in the vector $\kappa$. The identity matrix is denoted by I, with its dimension inferred by context. An eigenvalue of a matrix is denoted by $\lambda$ unless otherwise specified.

Let the high-fidelity dynamical system be represented by $$\dot{\theta}(t)=g(t,\theta(t),u(t)), \quad (1)$$

which describes the equations of motion of a spacecraft in the non-inertial rotating frame (henceforth referred to as the rotating frame) considered in the CR3BP. The origin of this frame is at the Earth-Moon barycenter, with x-axis pointing towards the center of mass of Moon and z-axis along the angular momentum vector of the Earth-Moon system in the CR3BP. This frame is commonly chosen for the analysis of NRHOs since it is relevant for observation and communication from Earth. In equation (1), $\dot{\theta}(t)$ corresponds to time derivative of the spacecraft state $\theta$, g is a function of time, and u(t) corresponds to the control input that represents the rate of change of the state, $\theta$. The right-hand-side of the model in (1) accounts for the major predictable external forces acting on the spacecraft mentioned above. The state vector $\theta \triangleq [r^T \ v^T]^T$ consists of the spacecraft position vector r and velocity vector v in the rotating frame, and u represents the control input vector.

Control Model: The control approach developed in the following section makes use of impulsive thrusters to execute maneuvers, wherein a thrust impulse is modelled to cause an instantaneous change in velocity of the spacecraft. Consider the motion of the spacecraft in the time interval $[t_1, t_2]$ with a thrust impulse $\zeta \in \mathbb{R}^3$ applied at $t' \in (t_1, t_2)$. The control input u(t) can be represented as $$u(t) = \begin{bmatrix} 0_3 \\ \zeta \end{bmatrix} \delta(t-t'), \text{ for } t \in [t_1, t_2], \quad (2)$$

where $\delta(t)$ is the Dirac delta function. The right-hand-side of (1) may be rewritten as $$g(t,\theta(t),u(t))=f(t,\theta(t))+u(t), \quad (3)$$

for $t \in [t_1, t_2]$, where f includes the previously mentioned external forces acting on the spacecraft. The (uncontrolled) natural motion of the spacecraft is thus given by $$\dot{\theta}(t)=f(t,\theta(t)). \quad (4)$$

The spacecraft state at $t_2$ obtained after the impulse at $t'$ can be then determined as follows $$\theta(t_2) = \theta(t_1) + \int_{t_1}^{t_2} g(\tau, \theta(\tau), u(\tau))d\tau, \quad (5)$$

$$= \theta(t_1) + \int_{t_1}^{t_2} \left( \begin{bmatrix} 0_3 \\ \zeta \end{bmatrix} \delta(\tau-t') + f(\tau, \theta(\tau)) \right) d\tau,$$

$$= \theta(t') + \int_{t'}^{t_2} f(\tau, \theta(\tau))d\tau,$$

where $$\theta(t') = \theta(t_1) + \begin{bmatrix} 0_3 \\ \zeta \end{bmatrix} + \int_{t_1}^{t'} f(\tau, \theta(\tau))d\tau. \quad (6)$$

While the propagation of spacecraft dynamics with impulsive thrust (6) is used in the subsequent development, wkith minor modifications, the control approach may be adapted for thrust pulses of finite-duration. Note that finite-duration thrust pulses on the order of minutes can be approximated fairly well by thrust impulses due to the sufficiently slow time scales of the system dynamics (4).

Baseline Solution and Linearization: The high-fidelity NRHO solution of (4) is dentoed as the baseline solution $\bar{\theta}(t)$. The baseline solution is an uncontrolled, natural motion trajectory which lies near the NRHO of the CR3BP, and is estimated using the multiple shooting approach.

Referring to FIG. 2A, the baseline solution $\bar{\theta}(t)$ 201 consists of $K \triangleq 60$ revolutions around the Moon (shown as 203) spanning $t_{max} \triangleq 394$ days, where $t \in [0, t_{max}]$ with t=0 corresponding to the Julian date epoch of Jan. 13, 2023. The position in each revolution which is farthest from the moon is referred to as an apolune, and the corresponding time instants are of particular importance to the control strategy of Section 3. Apolune approach times for K revolutions of the baseline solution $\bar{\theta}(t)$ are given by $t_{apo}^0 < t_{apo}^1 < \ldots < t_{apo}^K$, where $t_{apo}^0 = 0$ and $t_{apo}^K = t_{max}$.

In addition to the baseline, the following section makes use of the linear time-varying system, to signify the uncontrolled natural motion of the spacecraft as:

$$\dot{\theta}(t) \approx A(t)\theta(t)+b(t), \quad (7)$$

where,

A(t) is the linearized dynamics of the system in continuous time and is expressed as $$A(t) = \frac{\partial f(\tau, \omega)}{\partial \omega}\bigg|_{(t,\bar{\theta}(t))}, \quad (8)$$

and $$b(t)=(I-A(t))\bar{\theta}(t), \quad (9)$$

which approximates solutions of (4) near $\bar{\theta}(t)$.

The proposed control strategy aims to keep the spacecraft in the region of the state space close to the baseline[1] (i.e. the region where deviation of the spacecraft from the baseline is much smaller than the scale of the baseline) where the linear approximation (7), which, along with the baseline solution $\bar{\theta}(t)$, can be computed a priori, is valid. Hence, the linear model, although imperfect, is useful for predicting future evolution of the nonlinear dynamics (4) and for determining appropriate control action.

The finite-time behavior of solutions to (4) near the baseline solution is particularly useful and can be analyzed using the discrete-time counterpart of (7). In some example embodiments, if the spacecraft is at $\bar{\theta}_1$ in the vicinity of $\bar{\theta}(t_1)$ for some $t_1 \in [0, t_{max}]$, then its state at $t_2 > t_1$, denoted by $\bar{\theta}_2$, can be approximated as $$\bar{\theta}_2 \approx \Phi(t_2,t_1)\bar{\theta}_1+\chi(t_2,t_1), \quad (10)$$

where $\Phi(t_2, t_1)$ is the state transition matrix (STM) for the time interval $[t_1, t_2]$ obtained by propagating the linear system $$\dot{\Phi}(t,t_1)=A(t)\Phi(t,t_1), t \geq t_1, \quad (11)$$

over the time interval $[t_1, t_2]$ with initial condition $\Phi(t_1, t_1)=I$, and $\chi(t_2, t_1)$ is the residual given by:

$$\chi(t_2,t_1)=\int_{t_1}^{t_2}\Phi(t_2,\tau)b(\tau)d\tau. \quad (12)$$

This embodiment is described in flowchart 5a of FIG. 1B. For an eigenvector v of the STM $\Phi(t_2, t_1)$, there exists a complex number $\lambda$ such that $$\Phi(t_2,t_1)v=\lambda v. \quad (13)$$

If $|\lambda| \leq 1$ then v is said to be a non-expanding eigenvector, whereas if $|\lambda| > 1$ then v is said to be an expanding eigenvector. The STM provides useful local information about the solutions to (4) near $\bar{\theta}(t)$. The natural motion that results from an initial condition along the expanding and non-expanding eigenvectors of an STM is termed as expanding and non-expanding local eigenmotion, respectively. Ideally, a non-expanding local eigenmotion associated with $\Phi(t_2, t_1)$ does not diverge away from the baseline for the time interval $[t_1, t_2]$, whereas an expanding local eigenmotion diverges away during the same interval. In practice, a non-expanding local eigenmotion can still diverge away for $t<t_2$ owing to the fact that the linear estimate in (10) is only an approximation of the propagated nonlinear dynamics (4). Since the linear model is only valid close to the baseline, the performance of a non-expanding local eigenmotion can deteriorate when the initial condition is far away from the baseline solution $\bar{\theta}(t)$.

In order to produce the STM the orbital dynamics about the reference trajectory/baseline solution $\bar{\theta}(t)$ over a user determined finite horizon may be linearized and an eigenvalue decomposition of the resulting linearized STMs may be used. In some example embodiments, the STM is obtained as a direct outcome of the linearization process. Consider an n-dimensional dynamical system described by, $$\dot{x}(t) = f(t, x(t)).$$

Let r(t) denote a solution. The discrete-time update for perturbations of r(t) may be computed, i.e. given a time $t_h$ and a perturbed state $\tilde{r}(t) = r(t) + \delta r(t)$, it is an objective to find a local linear map (a state transition matrix) $\Phi(t, t+t_h)$ such that $\tilde{r}(t+t_h) - r(t+t_h) \approx \Phi(t, t+t_h) \delta r(t)$. To compute $\Phi(t, t+t_h)$ numerically, let $e_i$ be the elementary basis vector where the i-th element of $e_i$ is equal to 1 and let $\varepsilon > 0$ be a small parameter. Propagate $r(t) + \varepsilon e_i$ and $r(t) - \varepsilon e_i$ from t to $t+t_h$ numerically and refer to the solutions at time $t+t_h$ as $\tilde{r}_i^+$ and $\tilde{r}_i^-$, respectively. Then, the i-$t_h$ column of the STM $\Phi(t, t+t_h)$ may be approximated by the center difference formula:

$$\tilde{r}_i^+ - \tilde{r}_i^- \frac{\tilde{r}_i^+ - \tilde{r}_i^-}{2\varepsilon}$$

LOCAL EIGENMOTION CONTROL: Some example embodiments utilize STMs computed for a sequence of adjacent time intervals spanning $[0, t_{max}]$, termed as receding-horizon STMs, to determine non-expanding local eigenmotion corresponding to those intervals.

FIG. 2B is a schematic illustrating a representation of a maneuver that transfers the spacecraft to a non-expanding local eigenmotion at apolune when the trigger condition is satisfied, according to some example embodiments. A spacecraft may have a planned trajectory having an initial spacecraft path 251. Due to reasons discussed previously, the spacecraft may tend to diverge from the initial spacecraft path 251 to a diverging path 253. Whenever the spacecraft is predicted to diverge beyond a specified threshold (trigger 255) from the baseline solution $\bar{\theta}(t)$, it is maneuvered by one or more control maneuvers 257 to an initial condition of one of the non-expanding local eigenmotions 259 in a fuel-efficient manner.

In principle, an STM may be computed for the entire duration of the baseline, and a non-expanding eigenmotion may be picked to obtain a bounded relative motion trajectory for the entire duration of the baseline in one shot. However, this approach is computationally infeasible because the condition number of the STM increases as the time duration for which it holds increases. In practice, the longest time duration for which the STM is reliable is typically the time required for 12 revolutions around the Moon, which is about 78 days.

In this regard, some example embodiments consider maneuvers at apolune, but not necessarily every time the spacecraft visits apolune. The reason for this is as follows. For some $G \leq 12$ and $k \leq K-G$, assume that the spacecraft is initialized on a desirable local eigenmotion in proximity to the baseline by precisely placing it on an appropriate eigenvector of $\Phi(t_{apo}^{k+G}, t_{apo}^{k})$. Numerical simulations of (4) indicate that the spacecraft exhibits satisfactory bounded motion relative to the baseline for at least the following G revolutions around the Moon.

Figure 3:
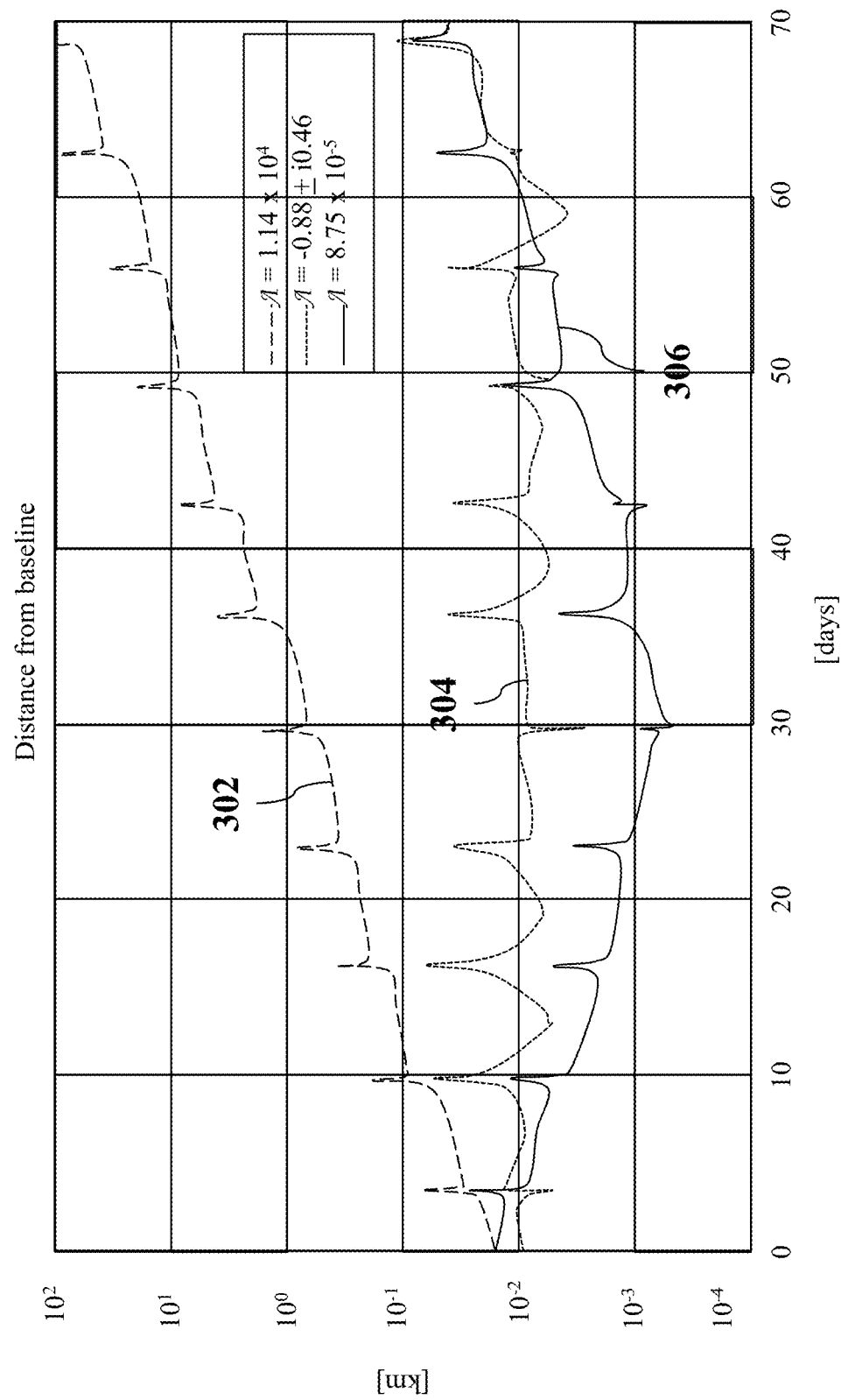
FIG. 3 is a graph illustrating the distance from the baseline of exemplary eigenmotions, according to some example embodiments.

FIG. 3 is a graph illustrating the distance from the baseline of exemplary eigenmotions, according to some example embodiments. Referring to FIG. 3, as previously mentioned, the longest time duration for which the STM is numerically reliable, which here means a condition number smaller than $10^8$, is the time required for $H \triangleq 12$ revolutions around the Moon. The eigenvalues of the STM estimated for $[t_{apo}^0, t_{apo}^H]$ are spec($\Phi(t_{apo}^H, t_{apo}^0))=\{1.14 \times 10^4, 4.48, -0.88+i0.46, -0.88-i0.46, 0.22, 8.75 \times 10^{-5}\}$. It may be observed that this STM has two expanding and four non-expanding eigenvectors. Owing to a significantly large eigenvalue, small perturbations to a spacecraft on the baseline NRHO solution may cause it to diverge away rapidly. This is in stark contrast to the favorable stability properties of the NRHO in CR3BP model. Furthermore, it may be observed that the spectrum of the STM estimated for $[t_{apo}^k, t_{apo}^{k+H}]$ for any $k \leq K-H$ is qualitatively similar that of the first H revolutions. As a result, typically any vector in the span of the four non-expanding eigenvectors of $\Phi(t_{apo}^{k+H}, t_{apo}^k)$ give rise to a non-expanding local eigenmotion for any $k \leq K-H$. Let these eigenvectors, indexed by the set $\mathcal{J}^k$, be denoted by $v_i^k$ for $i \in \mathcal{J}^k$, $k \leq K-H$.

Still referring to FIG. 3, the distance from the baseline of a spacecraft moving along some of the local eigenmotions of $\Phi(t_{apo}^H, t_{apo}^0)$ is shown. As is shown, the local eigenmotion 302 continues to diverge from the baseline solution with increase in the number of days while local eigenmotiom 304 and 306 converge at some instances. The magnitudes of both the eigenmotions 304 and 306 is less than one. These local eigenmotions 304 and 306 correspond to motions near the baseline solution based on the special states that come from the eigenvectors. There may exist multiple special states, such that when the controller come up with a control that moves the spacecraft from its current position to a desired position, the controller inherently chooses to keep the spacecraft to be in the span of the states that have eigenvalues less than one. Towards this end, the span of such states may arise from any linear combination of the states having eigenvalues less than one in both the local eigenmotions 304 and 306.

It is to be noted that the resulting linear combination does not include any component along a direction that has eigenvalue more than one. The basis of the selection of states in the linear combination is based on the criteria that it should provide the desired behaviour (motion) which does not diverge the spacecraft from the reference trajectory/baseline solution. The basis of the linear combination to decide how much of a state should be in the linear combination is based on the optimization problem. For example the objective function to minimize fuel consumption may be the major factor in deciding what component of a state should be there in the resultant linear combination. As such, among the many special states only those may be chosen, for which the optimization problem determines that the cost of fuel consumption is minimum. In this regard, it may be contemplated that in some example embodiments the resultant combination may include at least one of the special states. In scenarios where the resultant combination includes multiple states, the resultant state has a direction that is a hybrid of the directions of the selected eigenvectors. The eigenvectors leading to desired stable motion may only provide some principal directions and therefore in certain cases, it is imperative to chose a combination of those principal directions.

The spacecraft maneuvers occur over a short time interval, referred to as the control horizon, just before the spacecraft reaches an apolune. A maneuver to return the spacecraft state to a non-expanding local eigenmotion is initiated when a trigger condition is met. Let the position deviation of the spacecraft at $t=t_{apo}^k$ be denoted by $\Delta r_k$ for $k \leq K-H$. The trigger condition adopted in this work considers the change in distance between the spacecraft and the baseline solution since $t=0$ and since its recent visit to apolune, and is given by $$\Delta r_k > \min\{\rho \Delta r_0, \min\{2\Delta r_{k-1}, \Delta r_0\}\}, \quad (14)$$

where, $\rho$ is a tuning parameter that contributes to determining the nature of the generated bounded motion trajectory near the baseline.

If the trigger condition (14) is satisfied by $\Delta r_k$ for some $k<K$, a fuel-efficient maneuver for transferring the spacecraft to a non-expanding local eigenmotion starting at $t_{apo}^k$ is computed by solving the discrete-time optimal control problem $$\underset{\substack{\{\alpha_i\}_{i \in \mathcal{J}} \\ U \setminus \{u_j\}_{j=0}^{N-2} U\}}}{\text{minimize}} \sum_{j=0}^{N-2} \|u_j\|_2 \quad (15)$$

subject to $\theta(\tau_{j+1}^k) = \theta(\tau_j^k) + \begin{bmatrix} 0_3 \\ u_j \end{bmatrix} +$ $$\int_{\tau_j^k}^{\tau_{j+1}^k} f(\gamma, \theta(\gamma)) d\gamma, \ 0 \leq j \leq N-1, \quad (16)$$

$$\theta(\tau_{N-1}^k) = \bar{\theta}(\tau_{N-1}^k) + \sum_{i \in \mathcal{J}^k} \alpha_i v_i^k, \quad (17)$$

$$\theta(\tau_0^k) = \hat{\theta}(\tau_0^k), \quad (18)$$

for the time grid $T_N^k \triangleq [\tau_0^k, \ldots, \tau_{N-1}^k]$, where $\tau_j^k \triangleq t_{apo}^k - (N-1-j)\Delta t$ for $j=0, \ldots, N-1$. The maneuver consists of $N-1$ thrust impulses $\{u_j\}_{j=0}^{N-2}$ applied at intervals of $\Delta t$ starting from $\tau_0^k$. Under the assumption of impulsive input, the representation of the propagated equations of motion in (6) is utilized for constraint (16). The boundary condition (17) stipulates that the state at end of the control horizon lies in the span of the non-expanding eigenvectors of $\Phi(t_{apo}^{k+H+1}, t_{apo}^{k+1})$, which would give rise to a non-expanding local eigenmotion. Furthermore, in a practical implementation, the controller will not have access to the true state of the spacecraft. It receives an estimate, denoted by $\hat{\theta}(\tau_0^k$ in (18), by the state estimator.

FIG. 4 illustrates an algorithm associated with local eigenmotion control, according to some example embodiments. Referring to FIG. 4, the proposed control approach results in the automatic routine summarized by Algorithm 400 of FIG. 4.

The input to Algorithm 400 of FIG. 4 consists of the following: The baseline solution $\bar{\theta}(t)$, the time instants $t_{apo}^k$ for $k=0, \ldots, K$, corresponding to K+1 visits to apolune in the baseline, the initial distance $\Delta r_0$ of the spacecraft from the baseline, number of downstream revolutions H for which the STM is computed, the time intervals before each visit to apolune in the baseline solution (excluding the first), $T_N^k$ for $k=1, \ldots, K$, each with N grid points uniformly spaced by $\Delta t$.

Still referring to FIG. 4, Propagate ($\psi$, T) returns the state after propagating the high-fidelity prediction model (4) with initial condition $\psi$ for the time interval specified by the two-element vector T. When Algorithm 400 operates alongside a state-estimator, the first argument of Propagate, $\psi$, is an estimate of the spacecraft's current state.

Still referring to FIG. 4, PosDev($\theta$, $\psi$) returns the position deviation between states $\theta$ and $\psi$.

Still referring to FIG. 4, EigenMotion($\Delta r$, k, H) returns the state with a position deviation of $\Delta r$ from the state at the kth apolune of the baseline, and lying along the vector $\Sigma_{i \in \mathcal{J}^k} v_i$, where $v_i$ for $i \in \mathcal{J}^k$ are the non-expanding eigenvectors of $\Phi(t_{apo}^{k+H}, t_{apo}^k)$.

Still referring to FIG. 4, Trigger evaluates to true if the trigger condition (14) is satisfied.

Still referring to FIG. 4, OptCtrl($\psi$, $\Delta r$, $T_N^k$, $T_H^k$) solves the discrete-time optimal control problem (8) for the time interval $T_N^k$, i.e., for a maneuver to take place right before the spacecraft's kth apolune visit. Constraint (17) is constructed using the non-expanding eigenvectors of the STM for the interval $T_H^k=[t_{apo}^k, t_{apo}^{k+H}]$, and the initial condition (18) is specified by $\psi$. OptCtrl returns the control effort required for the maneuver, and the control solution estimated as a matrix with the control input for each 96 $_j^k$ for $j=0, \ldots, N-2$ stacked row-wise.

Still referring to FIG. 4, PropagateCtrl($\psi$, U, $T_N^k$) propagates (1) over the control horizon $T_N^k$ using the control solution U returned by OptCtrl with initial condition $\psi$.

Still referring to FIG. 4, $\Delta v_j$ for $j=1, \ldots, M$ is the cost for M maneuvers initiated in Algorithm 1 over the duration $[0, t_{max}]$. The cumulative cost of the M maneuvers is given by $\Delta v$.

According to some example embodiments, a practical implementation of the proposed control strategy may be demonstrated by augmenting Algorithm 400 of FIG. 4 with a Kalman Filter which estimates states using simulated range and range-rate measurements from the Deep Space Network (DSN). The measurements may be received at a rate of 6 hr which is reasonable for the DSN, and adequate for accurate state estimation. The errors in range and range-rate measurements come from standard normal distributions with standard deviation of 10 m and 1 mm s$^{-1}$, respectively.

The proposed approach is demonstrated for the case of two spacecraft executing bounded relative motion in the vicinity of the baseline solution. In particular, the Gateway is subjected to tight station keeping about the baseline while a visiting spacecraft is made to execute collision-free relative motion near the Gateway.

The trajectory computed for the Gateway, referred to as Solution 1, uses $\rho=10$, $\Delta t=6$ hr, $\Delta r_0=0.5$ km, and N=4, whereas the trajectory for the visiting spacecraft, referred to as Solution 2, is computed with $\rho=2$, $\Delta t=12$ hr, $\Delta r_0=50$ km, and N=6. Certain parameters in Algorithm 9 influence the nature of the bounded motion solution. In particular, the choice of $\rho$ in (14) and $\Delta r_0$ for the two Solutions are instrumental in ensuring that they remain collision-free. These parameters are tuned such that the resulting solutions are infrequent and fuel efficient.

It is worthwhile to note that the effect of navigation uncertainty is more prominent for tight station-keeping maneuvers near the baseline. When a maneuver is initiated close to the baseline, the final state (which lies close to the baseline and is aligned with the desired eigenvector) is more easily corrupted by navigation uncertainly owing to its small magnitude measured relative to the baseline. As a consequence, the spacecraft could be maneuvered to a state which is not properly aligned with the desired eigenvector, which will then cause the spacecraft to diverge prematurely. Hence, tight station keeping could potentially necessitate more annual maneuvers. This pitfall is avoided while generating Solution 1 by choosing a small value of $\Delta r_0$ and a large value for $\rho$. This allows the spacecraft to slowly offset from the baseline over a duration of 150 days and settle at a distance of about 9 km from the baseline where maneuvers are not triggered too often.

Figure 5:
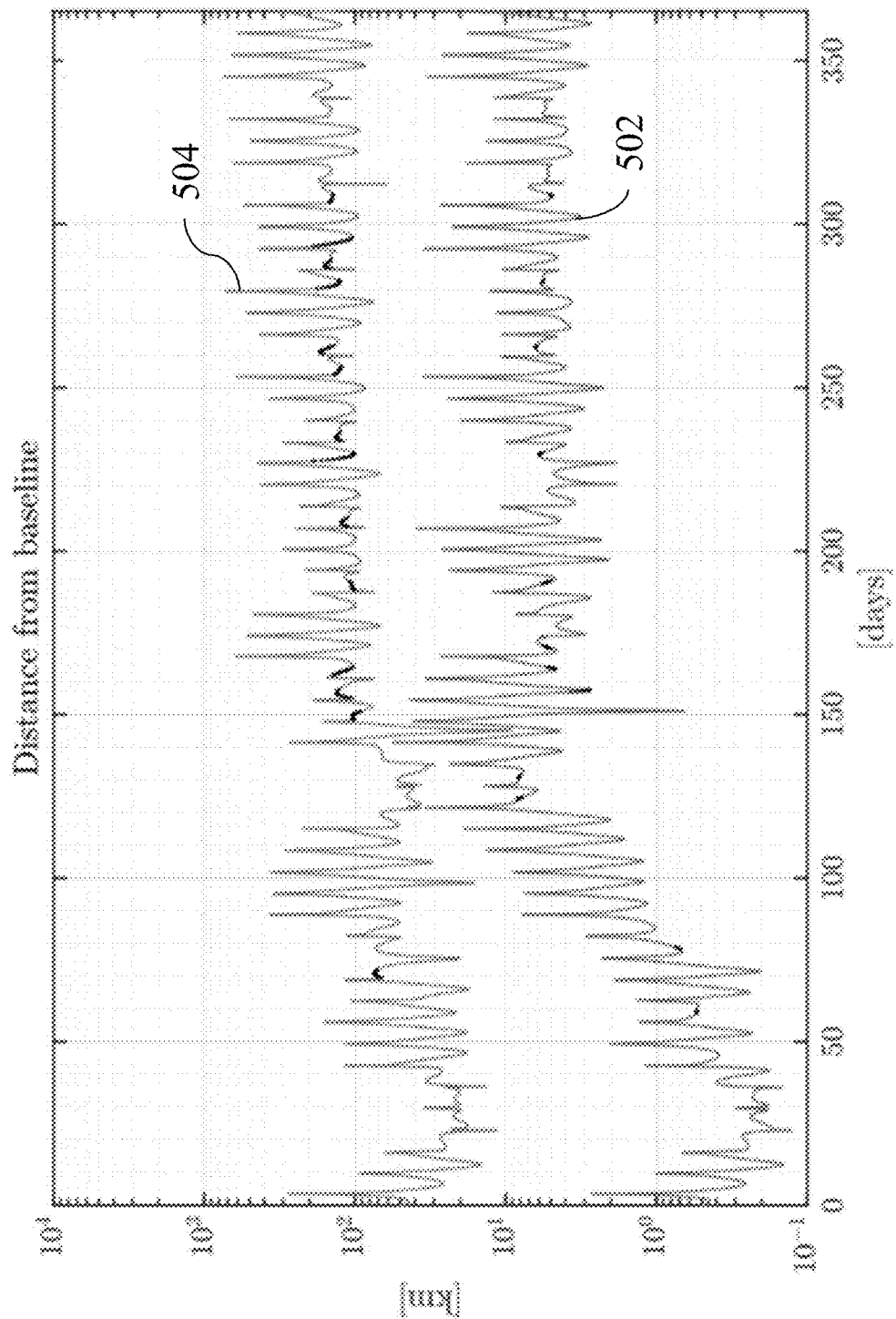
FIG. 5 is a graph illustrating position deviations from the baseline trajectory for two spacecraft operating under local eigenmotion control, according to some example embodiments.

FIG. 5 is a graph illustrating position deviations from the baseline trajectory for two spacecraft operating under local eigenmotion control, according to some example embodiments. The annual station-keeping performance of Solution 1 (502) and Solution 2 (504) are shown in Table 1 below, and the distance of the Solutions from the baseline as a function of time is shown in FIG. 5. With the proposed strategy, the annual station-keeping cost for the Gateway is comparable or better than that of state-of-the art techniques for station keeping on NRHO. The fuel required for the visiting spacecraft is significantly higher since it maintains a larger distance from the baseline than the Gateway. As such, each maneuver for transferring to a non-expanding local eigenmotion of the baseline is more expensive.

TABLE 1

Annual station-keeping performance

|  | Solution 1 | Solution 2 |
| --- | --- | --- |
| Maneuvers | 13 | 15 |
| Control duty cycle [% time annually] | 0.8 | 2.05 |
| Fuel consumption [ms $^{-1}$] | 0.05 | 0.7 |

Another notable benefit of the proposed approach is the relatively few maneuvers required to sustain annual bounded motion. The dark segments on Solutions 1 and 2 in FIG. 5 highlight the significantly small annual control duty cycle. Furthermore, Solutions 1 and 2 do not pose a risk of collision between the Gateway and the visiting spacecraft. The distance between the solutions is never smaller than 8 km.

Features

It is to be contemplated that a controller may maintain a spacecraft near a desired orbit using the proposed approach. In order to detect whether the trigger condition is met, the controller may determine the current state of the spacecraft within a specified time period. To determine the current state of the spacecraft, the processor may obtain measurements corresponding to one or a combination of positions and translational velocities of the spacecraft, and perturbations acting on a multi-object celestial system defined by the spacecraft and at least one celestial object. In order to determine the state transition matrix, the processor may obtain a linear model of a dynamical system defined by the spacecraft and at least one celestial object. The processor may also propagate the linear model of the dynamical system over a time period defined by a first time instance at which the spacecraft is at a current state and a second time instance at which the spacecraft will be at the upcoming state.

Furthermore, the control action may be determined by determining the direction of the correction of the upcoming state by linear combination of a direction of each non-expanding eigenvector of the STM to achieve a mixed state with natural motion that is a combination of corresponding eigenmotion of each non-expanding eigenvector of the STM.

In order to generate the control command, the processor may solve a nonlinear optimization problem to find a fuel-efficient maneuver that transfers the spacecraft to a set of desirable states that yield desirable natural motion. The nonlinear optimization problem is directed towards a finite horizon optimization of a model of the spacecraft, a set of objectives of motion of the spacecraft, and constraints on a propulsion system of the spacecraft and the motion of the spacecraft. The constraints on the propulsion system of the spacecraft and the motion of the spacecraft include one or more physical limitations of the spacecraft, one or more safety limitations on operation of the spacecraft, and one or more performance limitations on a trajectory of the spacecraft.

The spacecraft may execute a task of docking to a space station that maintains its position near the orbit at a third distance smaller than a station threshold, wherein the controller is further configured to select the spacecraft threshold greater than the station threshold.

The upcoming state of the spacecraft may include one or combination of positions, orientations, and translational and angular velocities of one or more of the spacecraft and a payload of the spacecraft, and perturbations acting on a multi-object celestial system defined by the spacecraft, the payload, and one or more celestial objects. The perturbations acting on the multi-object celestial system are natural orbital forces that include solar and lunar gravitational perturbations, anisotropic gravitational perturbations due to a central body's non-sphericity, solar radiation pressure, and air drag.

The high-fidelity reference trajectory is an uncontrolled, natural motion trajectory which lies near a near-rectilinear halo orbit (NRHO) in an Earth-Moon circular-restricted three-body problem, and is estimated using multiple shooting approach. The high-fidelity reference trajectory comprises a finite number of aperiodic revolutions around Moon over a finite number of days.

The orbit may be one of a circular orbit, an elliptic orbit, a halo orbit, a near rectilinear halo orbit, or a quasi-satellite orbit. The control command is generated as a solution to a model predictive control policy that produces the control command by optimizing a cost function over a receding horizon. The cost function includes a stabilization component for directing a movement of the spacecraft to the upcoming state, a component for an objective of an operation of the spacecraft, and a performance component for optimizing the movement of the spacecraft until the upcoming state is achieved. In some example embodiments, the cost function includes an objective function of minimizing fuel consumption for the spacecraft. The control command is generated for each specified time period of multiple specified time periods in the time horizon, or generated iteratively over a receding time-horizon. The control commands are outputted to an operations module of the controller, such that the operations module communicates the control commands to a thruster command module that receives the control commands as delta v commands, and the thruster command module is to convert the delta v commands to thruster commands, and send the thruster commands to a thruster processor of at least one thruster, to activate or not activate the at least one thruster for trajectory-tracking control of the vehicle, according To the converted delta v commands.

DEFINITIONS

According to aspects of the present disclosure, and based on experimentation, the following definitions have been established, and certainly are not a complete definition of each phrase or term. Wherein the provided definitions are merely provided as an example, based upon learnings from experimentation, wherein other interpretations, definitions, and other aspects may pertain. However, for at least a mere basic preview of the phrase or term presented, such definitions have been provided.

Space rendezvous: Space rendezvous can be a set of orbital maneuvers during which two spacecraft (or a chaser spacecraft and a target, (i.e. the target can be another spacecraft, space station, celestial body or orbital debris), arrive at the same orbit and approach to a very close distance (e.g. within visual contact).

Celestial System (Celestial Reference System): In astronomy, a celestial coordinate system (or celestial reference system) is a system for specifying positions of satellites, planets, stars, galaxies, and other celestial objects relative to physical reference points available to a situated observer (e.g. the true horizon and north cardinal direction to an observer situated on the Earth's surface). Coordinate systems can specify an object's position in three-dimensional space or plot merely its direction on a celestial sphere, if the object's distance is unknown or trivial. The coordinate systems are implemented in either spherical or rectangular coordinates. Spherical coordinates, projected on the celestial sphere, are analogous to the geographic coordinate system used on the surface of Earth. These differ in their choice of fundamental plane, which divides the celestial sphere into two equal hemispheres along a great circle. Rectangular coordinates, in appropriate units, are simply the cartesian equivalent of the spherical coordinates, with the same fundamental (x, y) plane and primary (x-axis) direction. Each coordinate system is named after its choice of fundamental plane.

FIG. 6A, FIG. 6B, FIG. 6C, FIG. 6D and FIG. 6E are schematic diagrams of some conventional parameters illustrating aspects used for implementing the methods and systems, according to some example embodiments.

Figure 6A:
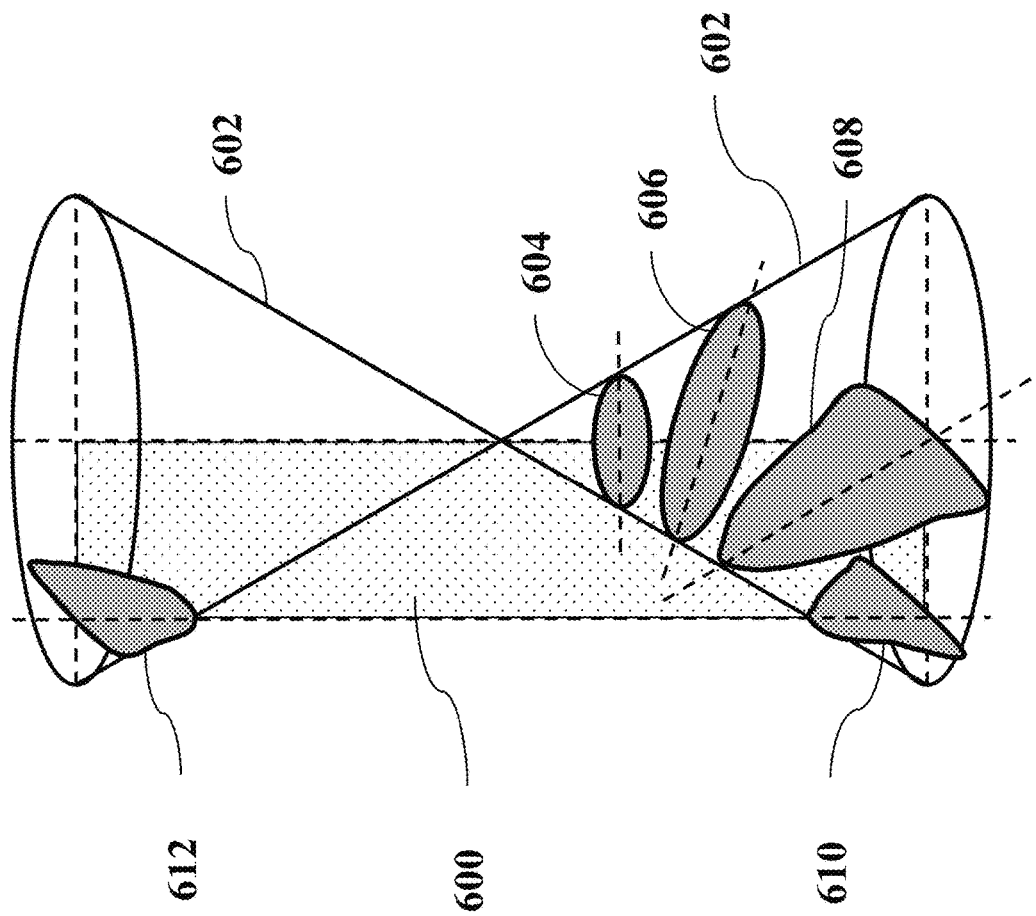
FIG. 6A, FIG. 6B, FIG. 6C, and FIG. 6D are schematic diagrams of some conventional parameters illustrating aspects used for implementing the methods and systems, according to some example embodiments.

Conic Sections: Referring to the FIG. 6A, a conic section (interchangeably also referred to as conic) is a curve formed by passing a plane through a right circular cone 602. FIG. 6A show an angular orientation of a plane 600 relative to the cone 602 that determines whether the conic section is a circle 604, ellipse 606, parabola 608, or hyperbola 610, 612. The circle 604 and the ellipse 606 arise when the intersection of cone 602 and plane 600 is a bounded curve. The circle 604 is a special case of the ellipse 606 in which the plane 600 is perpendicular to the axis of the cone 602. If the plane 600 is parallel to a generator line of the cone 602, the conic is called a parabola 608. Finally, if the intersection is an unbounded curve and the plane 600 is not parallel to a generator line of the cone 602, the figure is a hyperbola 610, 612. In the latter case, the plane 600 will intersect both halves of the cone 602, producing two separate curves. All conic sections can be defined in terms of the eccentricity. The type of conic section is also related to the semi-major axis and the energy. The table below shows the relationships between eccentricity, semi-major axis, and energy and the type of conic section.

| Conic Section | Eccentricity, e | Semi-major axis | Energy |
| --- | --- | --- | --- |
| Circle | 0 | = radius | <0 |
| Ellipse | 0 < e < 1 | >0 | <0 |
| Parabola | 1 | infinity | 0 |
| Hyperbola | >1 | <0 | >0 |

Satellite orbits can be any of the four conic sections.

Figure 6B:
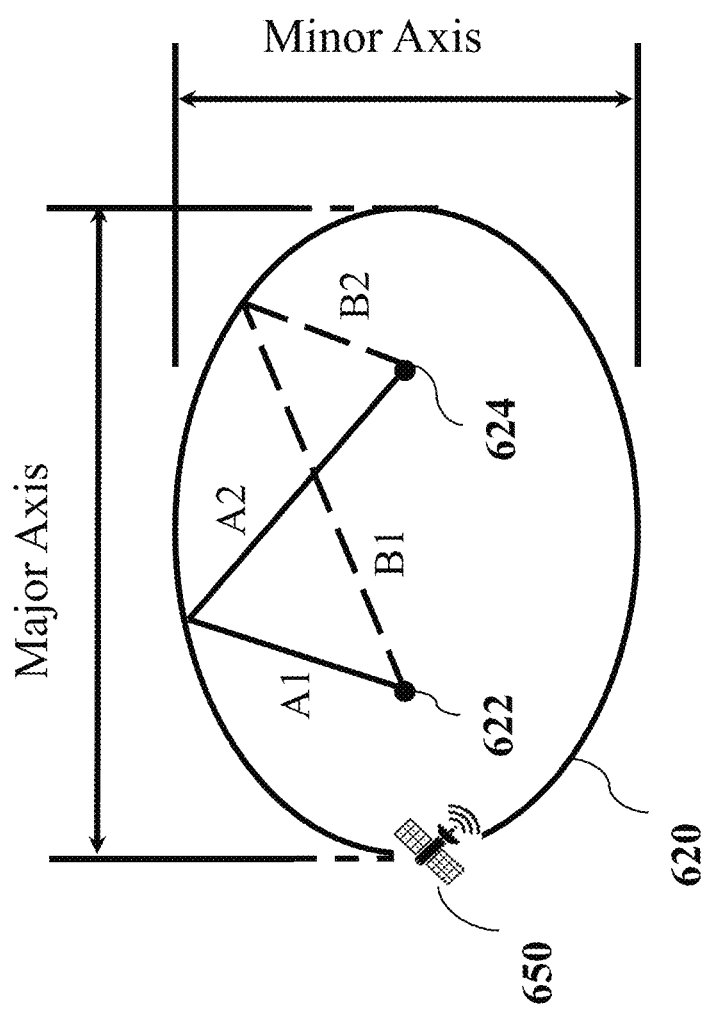
Figure 6C:
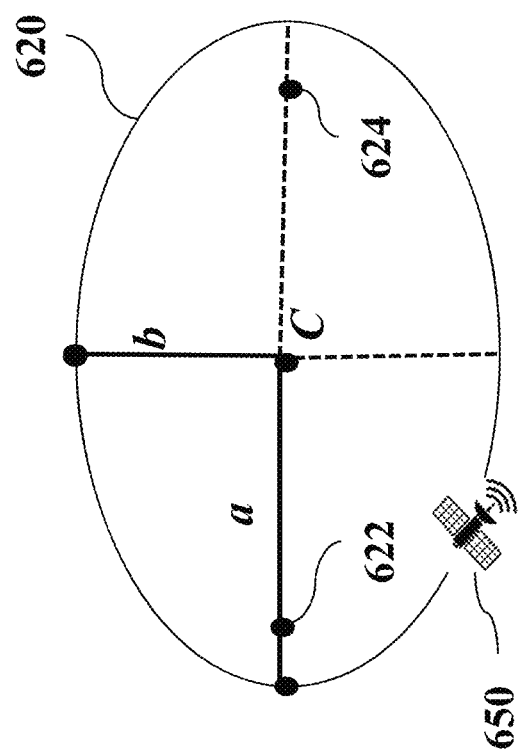
Figure 6D:
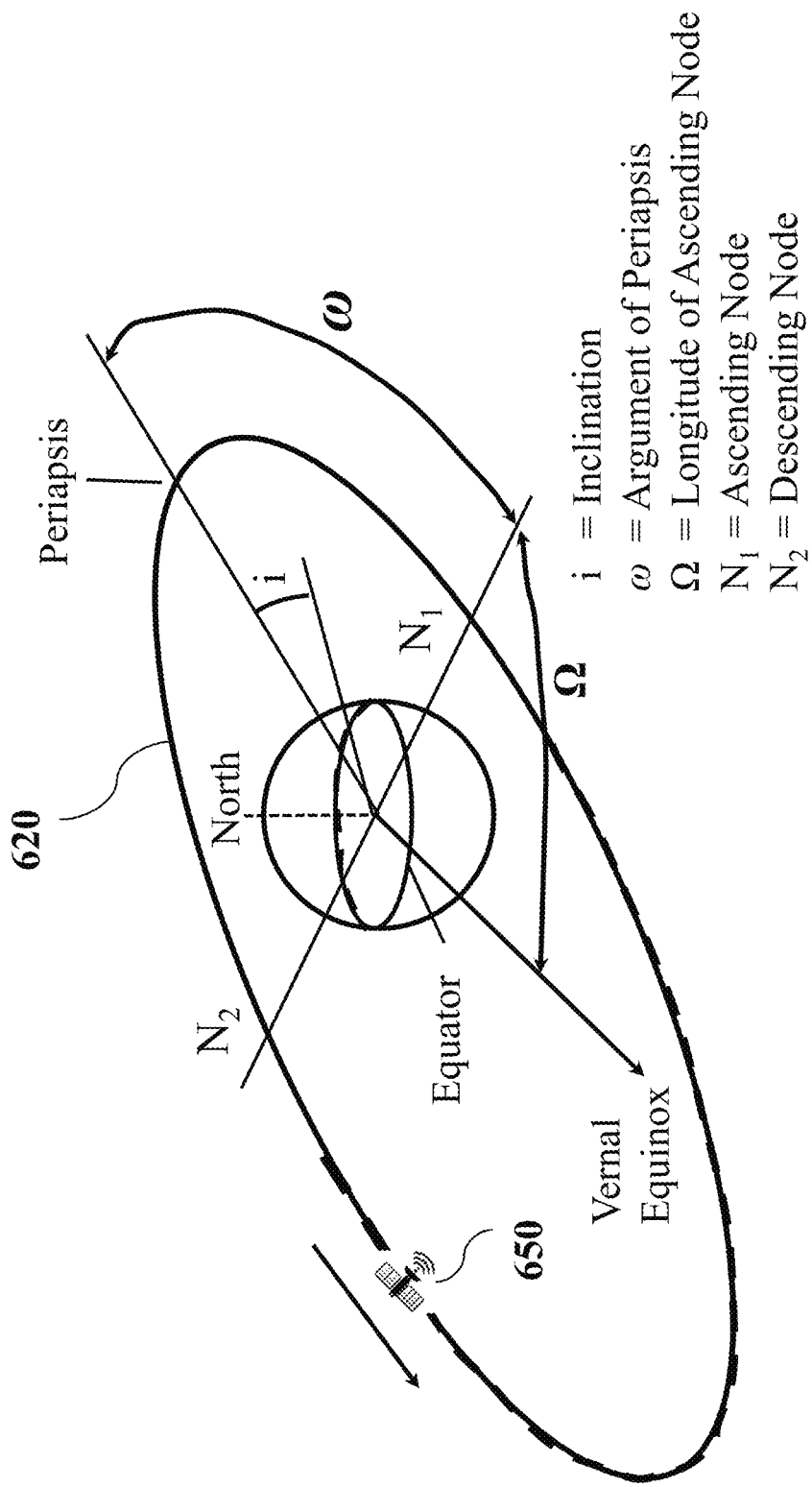

Referring to the FIG. 6B, FIG. 6C and FIG. 6D, in order to mathematically describe a conventional orbit six quantities, called orbital elements must be defined. The six orbital elements are;

Semi-Major Axis, a
Eccentricity, e
Inclination, i
Argument of Periapsis, ω
Time of Periapsis Passage, T
Longitude of Ascending Node, FIGS. 6B to FIG. 6D show a conventional orbiting satellite 650 that follows an oval shaped path known as an ellipse 620 with the body being orbited, called the primary, located at one of two points called foci 622, 624. FIG. 6C shows an ellipse 620 defined to be a curve with the following property: for each point on an ellipse, the sum of its distances from two fixed points, called foci 622, 624, is constant. The longest and shortest lines that can be drawn through the center of an ellipse are called the major axis and minor axis, respectively. The semi-major axis is one-half of the major axis and represents a satellite's mean distance from its primary. Eccentricity is the distance between the foci divided by the length of the major axis and is a number between zero and one. An eccentricity of zero indicates a circle.

FIG. 6D shows inclination i that is the angular distance between a satellite's orbital plane and the equator of its primary (or the ecliptic plane in the case of heliocentric, or sun centered, orbits). An inclination i of zero degrees indicates an orbit about the primary's equator in the same direction as the primary's rotation, a direction called prograde (or direct). An inclination i of 90 degrees indicates a polar orbit. An inclination i of 180 degrees indicates a retrograde equatorial orbit. A retrograde orbit is one in which a satellite moves in a direction opposite to the rotation of its primary.

Still referring to FIG. 6D, periapsis ω is the point in an orbit closest to the primary (i.e. for an object moving in an elliptical orbit about another celestial body, the point of closest approach is the periapsis, and at this point in the orbit, the object is travelling at its greatest speed via Kepler's Second Law). The opposite of periapsis ω, the farthest point in an orbit, is called apoapsis (i.e. an object moving in an elliptical orbit about another celestial body, the point of greatest separation is the apoapsis, at this point in the orbit, the object is travelling at its slowest speed via Kepler's Second Law). A perihelion is a position of closest approach, i.e. the shortest distance between the Sun and the planet, at this point in the orbit, the planet is moving at its maximum speed via Kepler's Second Law. An aphelion is a greatest distance between the Sun and the planet, at this point in the orbit, the planet is moving at its slowest speed via Kepler's Second Law, such that the aphelion refers specifically to orbits around the Sun, and is equivalent to the apoapsis of a general orbit. Wherein, the periapsis co and apoapsis are usually modified to apply to the body being orbited, such as perihelion and aphelion for the Sun, perigee and apogee for Earth, perijove and apojove for Jupiter, perilune and apolune for the Moon, etc. The argument of periapsis ω is the angular distance between the ascending node $N_1$ and the point of periapsis (see FIG. 11E). The time of periapsis passage T is the time in which a satellite moves through its point of periapsis.

Periapsis: The point of a body's elliptical orbit about the system's center of mass where the distance between the body and the center of mass is at its minimum. (also called argument of perifocus or argument of pericenter), symbolized as ω, is one of the orbital elements of an orbiting body. Parametrically, ω is the angle from the body's ascending node to its periapsis, measured in the direction of motion. For specific types of orbits, words including perihelion (for heliocentric orbits), perigee (for geocentric orbits), Periastron (for orbits around stars), and so on may replace the word periapsis. (See apsis for more information.) An argument of periapsis of 0° means that the orbiting body will be at its closest approach to the central body at the same moment that it crosses the plane of reference from South to North. An argument of periapsis of 90° means that the orbiting body will reach periapsis at its north most distance from the plane of reference. Adding the argument of periapsis to the longitude of the ascending node gives the longitude of the periapsis. However, especially in discussions of binary stars and exoplanets, the terms "longitude of periapsis" or "longitude of periastron" are often used synonymously with "argument of periapsis".

Apoapsis: The point of a body's elliptical orbit about the system's centre of mass where the distance between the body and the centre of mass is at its maximum.

Nodes: are the points where an orbit crosses a plane, such as a satellite crossing the Earth's equatorial plane. If the satellite crosses the plane going from south to north, the node is the ascending node $N_1$; if moving from north to south, it is the descending node $N_2$. The longitude of the ascending node $N_1$ is the node's celestial longitude. Celestial longitude is analogous to longitude on Earth and is measured in degrees counter-clockwise from zero with zero longitude being in the direction of the vernal equinox Ω.

Types of orbits: Geosynchronous orbits (GEO): are circular orbits around the Earth having a period of 24 hours. A geosynchronous orbit with an inclination of zero degrees is called a geostationary orbit. A spacecraft in a geostationary orbit appears to hang motionless above one position on the Earth's equator. For this reason, they are ideal for some types of communication and meteorological satellites. A spacecraft in an inclined geosynchronous orbit will appear to follow a regular figure-8 pattern in the sky once every orbit. To attain geosynchronous orbit, a spacecraft is first launched into an elliptical orbit with an apogee of 35,786 km (22,236 miles) called a geosynchronous transfer orbit (GTO). The orbit is then circularized by firing the spacecraft's engine at apogee.

Polar orbits (PO): are orbits with an inclination of 90 degrees. Polar orbits are useful for satellites that carry out mapping and/or surveillance operations because as the planet rotates the spacecraft has access to virtually every point on the planet's surface. Walking orbits: An orbiting satellite is subjected to a great many gravitational influences. First, planets are not perfectly spherical and they have slightly uneven mass distribution. These fluctuations have an effect on a spacecraft's trajectory. In addition, the sun, moon, and planets contribute a gravitational influence on an orbiting satellite. With proper planning, it is possible to design an orbit, which takes advantage of these influences to induce a precession in the satellite's orbital plane. The resulting orbit is called a walking orbit.

Sun synchronous orbits (SSG): are walking orbits whose orbital plane precesses with the same period as the planet's solar orbit period. In such an orbit, a satellite crosses periapsis at about the same local time every orbit. This is useful if a satellite is carrying instruments, which depend on a certain angle of solar illumination on the planet's surface. In order to maintain an exact synchronous timing, it may be necessary to conduct occasional propulsive maneuvers to adjust the orbit.

Molniya orbits: are highly eccentric Earth orbits with periods of approximately 12 hours (2 revolutions per day). The orbital inclination is chosen so the rate of change of perigee is zero, thus both apogee and perigee can be maintained over fixed latitudes. This condition occurs at inclinations of 63.4 degrees and 116.6 degrees. For these orbits, the argument of perigee is typically placed in the southern hemisphere, so the satellite remains above the northern hemisphere near apogee for approximately 11 hours per orbit. This orientation can provide good ground coverage at high northern latitudes.

Hohmann transfer orbits: are interplanetary trajectories whose advantage is that they consume the least possible amount of propellant. A Hohmann transfer orbit to an outer planet, such as Mars, is achieved by launching a spacecraft and accelerating it in the direction of Earth's revolution around the sun until it breaks free of the Earth's gravity and reaches a velocity, which places it in a sun orbit with an aphelion equal to the orbit of the outer planet. Upon reaching its destination, the spacecraft must decelerate so that the planet's gravity can capture it into a planetary orbit. For example, to send a spacecraft to an inner planet, such as Venus, the spacecraft is launched and accelerated in the direction opposite of Earth's revolution around the sun (i.e. decelerated) until it achieves a sun orbit with a perihelion equal to the orbit of the inner planet. It should be noted that the spacecraft continues to move in the same direction as Earth, only more slowly. To reach a planet requires that the spacecraft be inserted into an interplanetary trajectory at the correct time so that the spacecraft arrives at the planet's orbit when the planet will be at the point where the spacecraft will intercept it. This task is comparable to a quarterback "leading" his receiver so that the football and receiver arrive at the same point at the same time. The interval of time in which a spacecraft must be launched in order to complete its mission is called a launch window.

Near-rectilinear halo orbits (NRHOs): can be defined as "almost stable" orbits where stability is measured using stability indexes ν.

CR3BP model: Near rectilinear halo orbits are members of the broader set of L1 and L2 families of halo orbits, that is, foundational structures that exist in the dynamical environment modeled in terms of multiple gravitational bodies. L1 is a point ¹⁄₁₀₀ of the way from Earth to the sun, or the first Lagrangian point, where centripetal force and the gravitational pulls of Earth and sun all cancel out. It is one of five such points in the Earth-sun system where a space probe could in principle sit forever as though balanced on the gravitational version of the head of a pin. Another one, L2, is on the far side of Earth from the sun, 1.6 million kilometers out. Both L1 and L2 are ideal venues from which to look out toward the universe, and L1 is a good vantage on Earth and the sun, as well. However, they have drawbacks: At L1, a spacecraft's signal would be overwhelmed by the radiation from the sun behind it. At L2, Earth's shadow blocks the solar radiation a probe needs to power its instruments. The solution is to put spacecraft into "halo orbits" around the Lagrangian points. A spacecraft in a halo orbit around L1 describes huge, lazy loops perpendicular to the Earth-sun axis, endlessly falling toward the balance point. The fundamental behavior also persists in a higher-fidelity model and, thus, supports potential long-term mission scenarios for spacecraft, possibly crewed, in orbits near the Moon. This type of trajectory is first identified in a simplified representation of the gravitational effects in the Earth-Moon system, i.e., the Circular Restricted Three Body Problem (CR3BP). In the CR3BP model, Near-rectilinear halo orbits (NRHOs), i.e. can be defined as "almost stable" orbits where stability is measured using stability indexes v, are characterized by favorable stability properties that suggest the potential to maintain NRHO-like motion over a long duration while consuming few propellant resources. Some NRHOs also possess favorable resonance properties that can be exploited for mission design and are particularly useful to avoid eclipses. For actual mission implementations, however, transfers into such orbits, as well as station keeping strategies, must be demonstrated in a higher-fidelity ephemeris model. Station keeping algorithms for libration point orbits have previously been explored within this dynamical regime in the context of both planar Lyapunov and classical three-dimensional halo orbits. However, NRHOs as constructed in the ephemeris regime.

Station Keeping: In astrodynamics, the orbital maneuvers made by thruster burns that are needed to keep a spacecraft in a particular assigned orbit are called orbital station-keeping. For many Earth satellites the effects of the non-Keplerian forces, i.e. the deviations of the gravitational force of the Earth from that of a homogeneous sphere, gravitational forces from Sun/Moon, solar radiation pressure and air drag, must be counteracted. The deviation of Earth's gravity field from that of a homogeneous sphere and gravitational forces from Sun/Moon will in general perturb the orbital plane. For a sun-synchronous orbit the precession of the orbital plane caused by the oblateness of the Earth is a desirable feature that is part of the mission design but the inclination change caused by the gravitational forces of Sun/Moon is undesirable. For geostationary spacecraft the inclination change caused by the gravitational forces of the Sun & Moon must be counteracted by a rather large expense of fuel, as the inclination should be kept sufficiently small for the spacecraft to be tracked by a non-steerable antenna. For spacecraft in low orbits the effects of atmospheric drag must often be compensated for. For some missions this is needed simply to avoid re-entry; for other missions, typically missions for which the orbit should be accurately synchronized with Earth rotation, this is necessary to avoid the orbital period shortening. Solar radiation pressure will in general perturb the eccentricity (i.e. the eccentricity vector), see Orbital perturbation analysis (spacecraft). For some missions this must be actively counter-acted with maneuvers. For geostationary spacecraft the eccentricity must be kept sufficiently small for a spacecraft to be tracked with a non-steerable antenna. Also for Earth observation spacecraft for which a very repetitive orbit with a fixed ground track is desirable, the eccentricity vector should be kept as fixed as possible. A large part of this compensation can be done by using a frozen orbit design, but for the fine control maneuvers with thrusters are needed. For spacecraft in a halo orbit around a Lagrangian point station-keeping is even more fundamental, as such an orbit is unstable; without an active control with thruster burns the smallest deviation in position/velocity would result in the spacecraft leaving the orbit completely.

Dominant Disturbance Forces: Dominant disturbance is one which causes deviation larger than the navigation error of the deep space network (DSN) positioning system. Also, a dominant force can be defined as a force whose effect is larger than the largest unpredictable force. Also, a largest Unpredictable Force can be due to position and velocity measurement error.

Perturbation: can be a complex motion of a massive body subject to forces other than the gravitational attraction of a single other massive body. The other forces can include a third (fourth, fifth, etc.) body, resistance, as from an atmosphere, and the off-center attraction of an oblate or otherwise misshapen body. The perturbing forces of the Sun on the Moon at two places in its orbit. The dark dotted arrows represent the direction and magnitude of the gravitational force on the Earth. Applying this to both the Earth's and the Moon's position does not disturb the positions relative to each other. When it is subtracted from the force on the Moon (dark solid arrow), what is left is the perturbing force (dark double arrows) on the Moon relative to the Earth. Because the perturbing force is different in direction and magnitude on opposite sides of the orbit, it produces a change in the shape of the orbit.

Figure 7A:
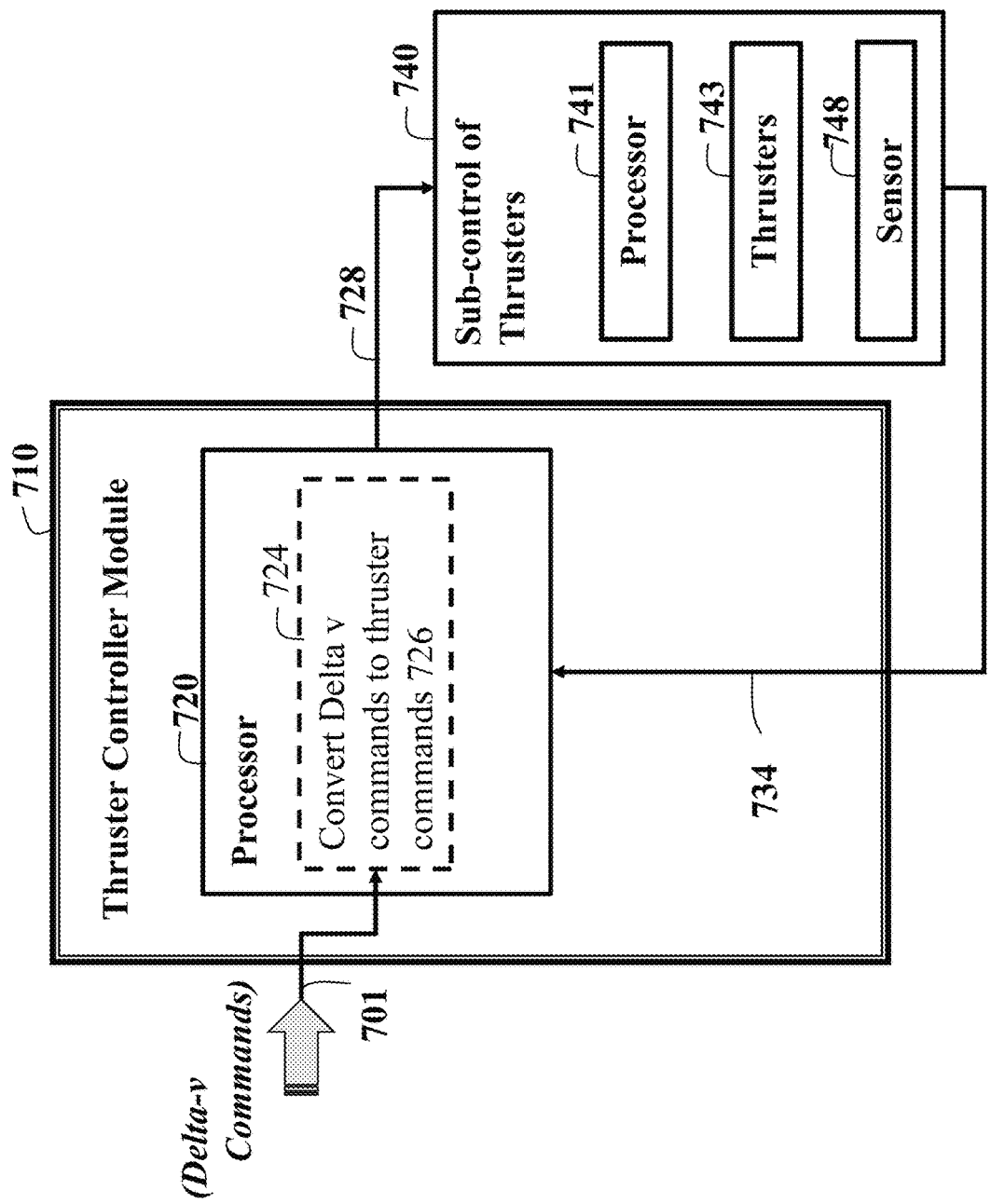
FIG. 7A is a block diagram illustrating some components for implementing the generated control commands, according to some example embodiments.

FIG. 7A is a block diagram illustrating some components for implementing the generated control commands, according to an embodiment of the present disclosure. A thruster controller module 710 may include at least one processor 720 communicatively coupled via one or more interfaces to a controller such as the controller 101 of FIG. 1E. Additionally, the processor 720 may be coupled via a bus 728 and 734 to sub control 740 of thrusters. The processor 720 may receive the control commands as delta v-commands 701. The processor 720 may convert 724 the received delta-v commands 701 to thruster commands 726 that can be sent via the bus 728 to the sub-control 740 of thrusters 743, that can be connected to sensors 748. The sub-control thruster 740 may comprise another processor 741 to process the thruster commands and issue control action as commanded.

Figure 7B:
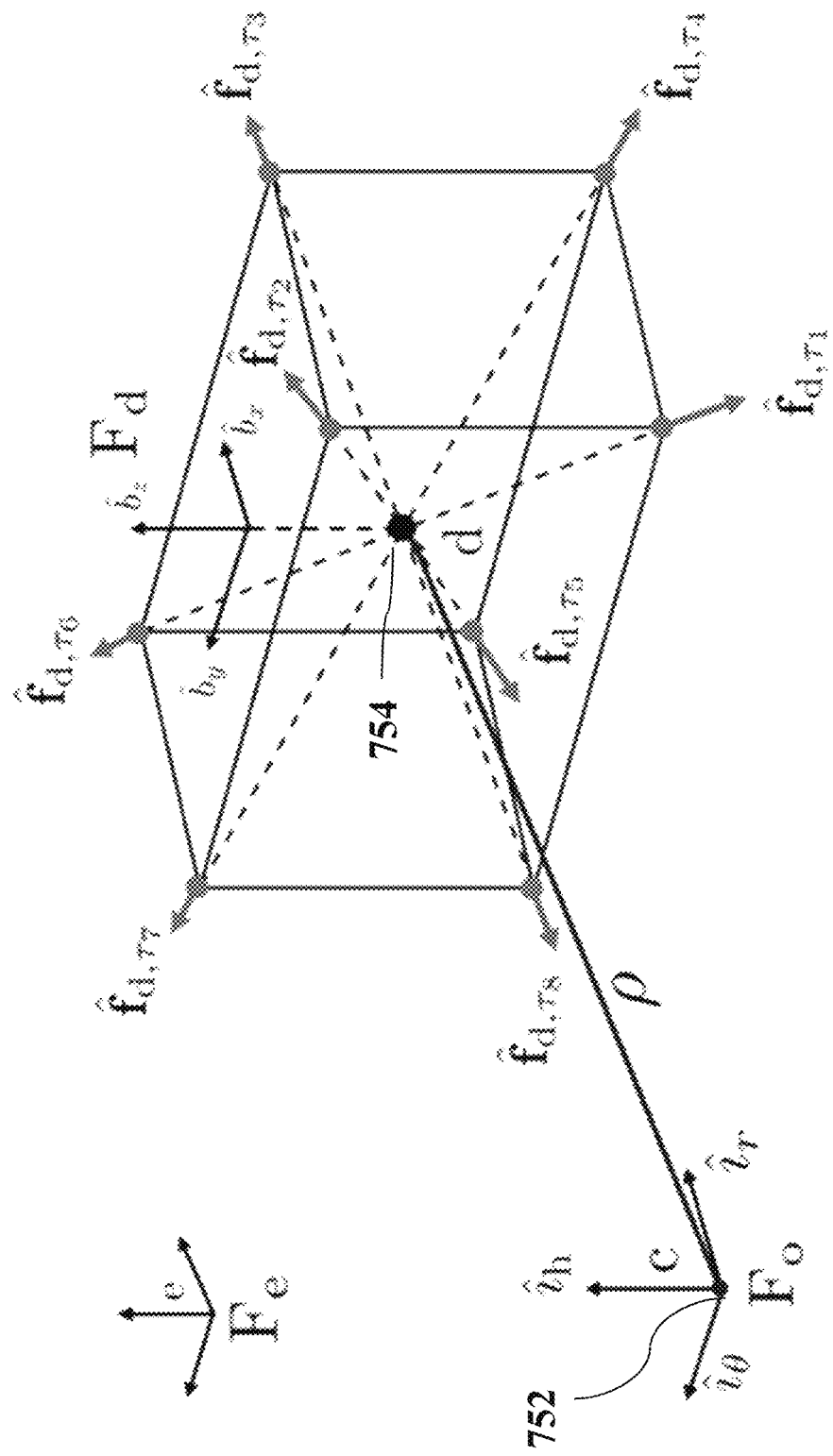
FIG. 7B is a schematic diagram illustrating aspects of a thruster configuration, according to some example embodiments.

FIG. 7B is a schematic diagram illustrating aspects of a thruster configuration, according to an embodiment of the present disclosure. In some example embodiments, a spacecraft may be equipped with eight thrusters that are mounted at the corners of the spacecraft so that they align and produce pure forces that act on the center of mass of the spacecraft without producing any torques that would rotate the spacecraft. A controller such as the sub-control 740 of FIG. 7A may send signals to activate or deactivate the thrusters in order to move the spacecraft along a commanded trajectory.

Refering to FIG. 7B, a chief 752 and a deputy 754 may be in orbit around a central body, e.g., Earth. The frame $F_e$ is the Earth-Centered Inertial (ECI) frame, e is an unforced particle, and it may be assumed that e is collocated with the center of the Earth. The deputy's center of mass is denoted by 'd' and has a deputy-fixed frame $F_d$. The chief's center of mass is denoted by 'c' and has a chief-fixed frame $F_c$. The chief's angular velocity with respect to the inertial frame is $\omega_{c/e}$ and may be nonzero, i.e. the chief may be uncontrolled and tumbling. The chief's orbit frame $F_o=\{\hat{1}_r, \hat{1}_\theta, \hat{1}_h\}$ is Hill's frame with radial, along-track, and cross-track basis vectors. The vector $\hat{1}_r$ is parallel to the chief satellite's position vector, $\hat{1}_h$ points in the direction of the orbit's angular momentum, and $\hat{1}_\theta$ completes the right-hand rule. The deputy is controlled and assumed to be aligned with the chief's orbital frame $F_o$, i.e. $\omega_{d/o}=0$, for simplicity and given that reorientation of the deputy spacecraft can be achieved much faster than its orbit control, by a reaction wheel attitude control system. Both the chief and deputy's bodies are assumed to be rigid and all external forces acting on the spacecraft are assumed to act on the center of mass of their respective bodies.

Still referring to FIG. 7B, the translational equations of motion for the chief and deputy relative to the inertial frame $F_e$ are given by $$r_c'' = -\mu \frac{r_c}{\|r_c\|^3} + \frac{f_c}{m_c} \qquad (19)$$

$$r_d'' = -\mu \frac{r_d}{\|r_d\|^3} + \frac{f_d}{m_d} \qquad (20)$$

where $r_c$, $r_d$ are the position vectors of the chief and deputy centers of mass relative to the center of Earth, $m_c$, $m_d$ are the chief and deputy masses, $\mu$ is the gravitational constant of Earth, and $f_c$, $f_d$ represent perturbing forces acting on the chief and deputy, respectively. In general, these perturbations include orbital perturbations as well as control. In this study, the chief is assumed to follow Keplerian motion, i.e. $f_c=0$, and we neglect orbital perturbations on the deputy.

Given a chief and deputy spacecraft, the position of the deputy relative to the chief is given by $$\rho = r_d - r_c. \qquad (21)$$

Still referring to FIG. 7B, taking the derivative of the relative position (21) with respect to the chief's orbital frame $F_O$ yields $$\dot{\rho} = r_d' - r_c' - \omega_{O/e} \times \rho \qquad (22)$$

Taking the derivative of the relative velocity (22) with respect to the chief's orbital frame $F_o$ yields $$\ddot{\rho} = r_d'' - r_c'' - \dot{\omega}_{O/e} \times \rho - \omega_{O/e} \times (\omega_{O/e} \times \rho) - 2\omega_{O/e} \times \rho. \qquad (23)$$

Substituting (20) into (23) yields the full nonlinear relative equations of motion. For $$\|\rho\| \ll \|r_c\|, \qquad (24)$$

the equations of relative motion (23) can be linearized about the chief's trajectory and resolved in the chief's orbital frame $F_O$, yielding:

$$\delta\ddot{x} - \left(\frac{2\mu}{r_c^3} + \frac{h^2}{r_c^4}\right)\delta x + \left(\frac{2r_c' \cdot r_c}{r_c^4}h\right)\delta y - \left(\frac{2h}{r_c^2}\right)\delta\dot{y} = \frac{u_x}{m_c}, \qquad (25)$$

$$\delta\ddot{y} - \left(\frac{\mu}{r_c^3} - \frac{h^2}{r_c^4}\right)\delta y - \left(\frac{2r_c' \cdot r_c}{r_c^4}h\right)\delta x + \left(\frac{2h}{r_c^2}\right)\delta\dot{x} = \frac{u_y}{m_c}, \delta\ddot{z} + \left(\frac{\mu}{r_c^3}\right)\delta z = \frac{u_z}{m_c}$$

where $^o\rho = [\delta x\ \delta y\ \delta z]^T$ is the relative position resolved in $F_o$, $r_c = \|r_c\|$, $h = \|r_c \times r_c'\|$ is the inertial specific angular momentum of the chief's orbit, and $^o f_d = [u_x\ u_y\ u_z]^T$ is the control input applied to the deputy resolved in $F_o$.

Still referring to FIG. 7B, as $r_c$ and h vary along the orbit, the equations of motion (25) result in the linear-time varying system $$x(t) = A(t)x(t) + Bu(t), \qquad (26)$$

where $x = [\delta x\ \delta y\ \delta z\ \delta\dot{x}\ \delta\dot{y}\ \delta\dot{z}]^T$, and $u = ^o f_d$.

Figure 8:
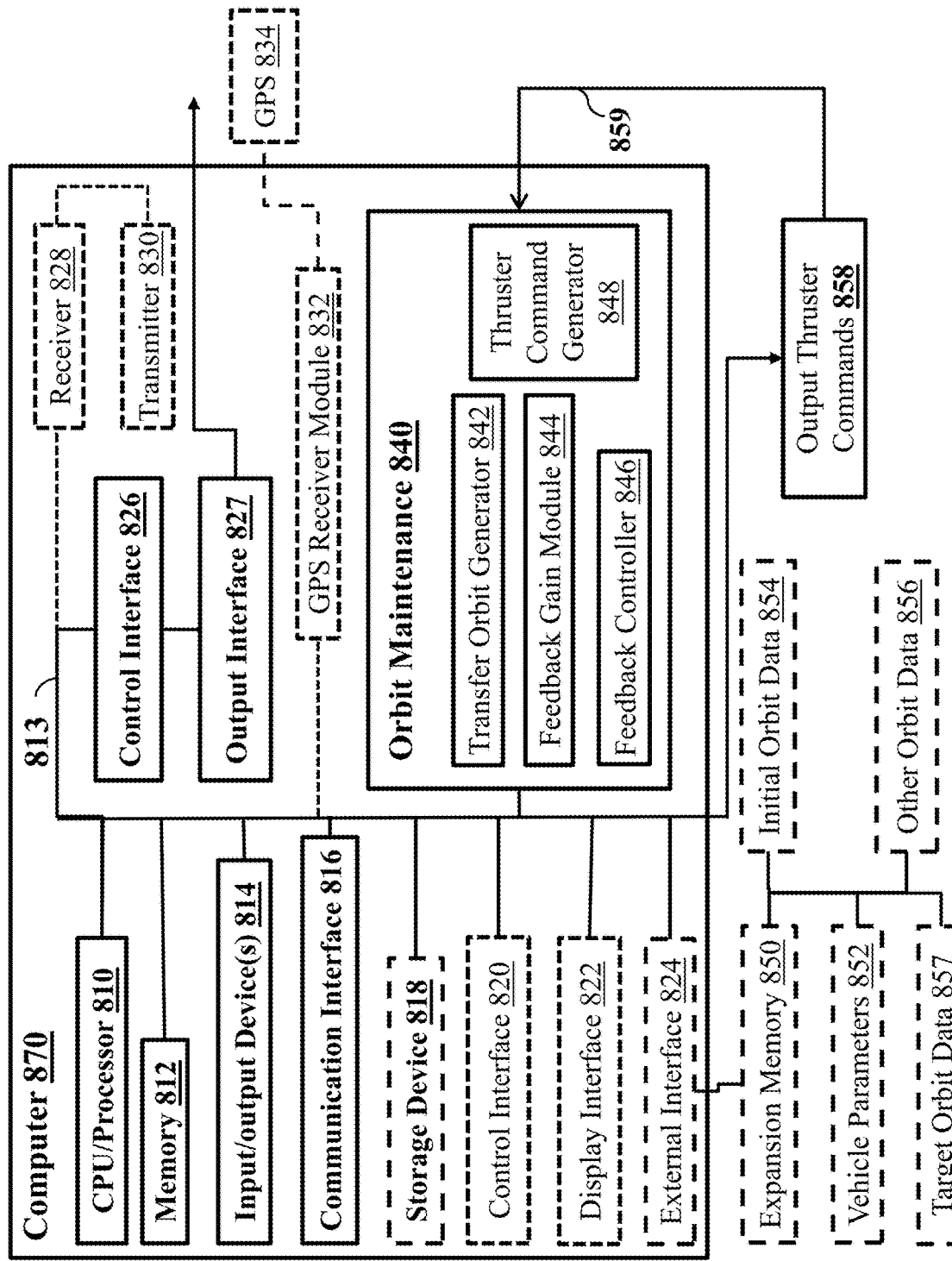
FIG. 8 is a schematic diagram illustrating some components used for implementing the methods and systems, according to some example embodiments.

FIG. 8 is a block diagram illustrating some components that may be used for implementing the systems and methods, according to some embodiments of the present disclosure. For example, a computer system 870 may be adapted for use in controlling movement of a spacecraft or vehicle. A CPU or processor(s) 810 may be connected via a bus system 813 to a memory 812, input/output devices 814 and a communication interface 816. Also connected to the bus system 813 can be a storage device 818, a control interface 820, display interface 822, and an external interface 824. The external interface 824 may be connected to an expansion memory 850, vehicle parameters database 852 that stores spacecraft specifications, thruster specifications, size, weight, etc. Further, the external interface 824 may be connected to an initial orbit database 854 that stores time, date, parameters including altitude, inclination, eccentricity, and the like regarding the orbit and other orbit database 856 (i.e., unique orbit data). The bus system 813 can also connect a control interface 826, output interface 827, receiver 828 and transmitter 830. Further, the bus system can connect a GPS receiver module 832 to a GPS 834.

The bus system 813 can connect an output thruster command module 858 to output the thruster commands. Furthermore, bus 859 may connect back to an Orbit Maintenance module 840 that comprises a transfer orbit generator for generating one or more transfer orbits for the spacecraft, a feedback gain module 844 for computing feedback gain, and a feedback controller 846. Additionally, the orbit maintenance module 840 may also comprise a thruster command generator 848.

Still referring to FIG. 8, the computer 870 can be a server or a desktop, a laptop, a mobile or other computer device or system with one or more processors 810. The processor 810 may be a central processing unit adapted for accessing code in the form of a transfer orbit generator 842 in a memory 812 or storage data 818 of the computer 870 (or in an expansion memory 850 or other data storage 852, 854, 856. Contemplated are external storage devices if further required depending upon the specific design and aspect of an intended hardware and goal implementation, according aspects related to systems and methods of the present disclosure. For example, the computer 870 can be used to implement the steps of the systems and methods, where the memory 812, and/or storage device 818 can store data.

The stored data in the memory 812 of FIG. 8 can include the executable modules, vehicle data and historical space data. For example, the vehicle data can include specifications of the spacecraft, dimensions, weight, performance data under varied conditions including gravitation forces, and other perturbations, i.e. complex motion(s) of a massive body subject to forces other than the gravitational attraction of a single other massive body in space. Further, the vehicle data can include data related to aspects related to vehicle dynamics associated with one or more of the multi-variables, i.e. (1) unusual orbital characteristics of a celestial body, i.e. a natural object which is located outside of Earth's atmosphere, such as the Moon, the Sun, an asteroid, planet, or star; (2) unusual orbital motion the celestial body; (3) celestial body's unusually close orbit around another celestial body; and (4) other known perturbations. The space data can include data related to celestial body(s) system, past missions to celestial body(s) and any other data related to space, the spacecraft and planning orbital designs to other celestial bodies in the universe. For example, stored as space data can include data about the moons of celestial body(s), such as characteristics of celestial body(s) that can be taken into consideration in developing orbital designs from an initial celestial body(s) orbit to a similar target celestial body(s) orbit.

Optionally, the stored data can be stored in the storage device 818, the external interface 824, that is connected an expansion memory 850 that connects to an initial orbit data database 854, other orbit data database 856 and vehicle parameters, specifications, performance, etc. data database 852, of FIG. 8.

Still referring to FIG. 8, the processor 810 of the computer 870 may be two or more processors depending upon the specific application. For example, some steps may require a separate processor to ensure a specific processing time or processing speed associated with the systems and methods of the present disclosure.

The receiver 828 or input interface can receive space data that may be up-to-date space data, obtained from either an Earth Mission Control Center or sensors associated with the spacecraft, or some other location, after the stored historical space data stored in the memory 812. The receiver 828 and transmitter 830 can provide a wireless venue for receiving and sending data to, for example, to an Earth Mission Control Center, or some other destination. A GPS receiver module 832 connected to a GPS 834 can be used for navigation related aspects. The computer 870 can include a control interface 820, display interface 822, and optionally external devices, control interfaces, displays, sensors, machines, etc., (not shown, see FIG. 8), that are contemplated for uses related to the systems and methods of the present disclosure.

Figure 9:
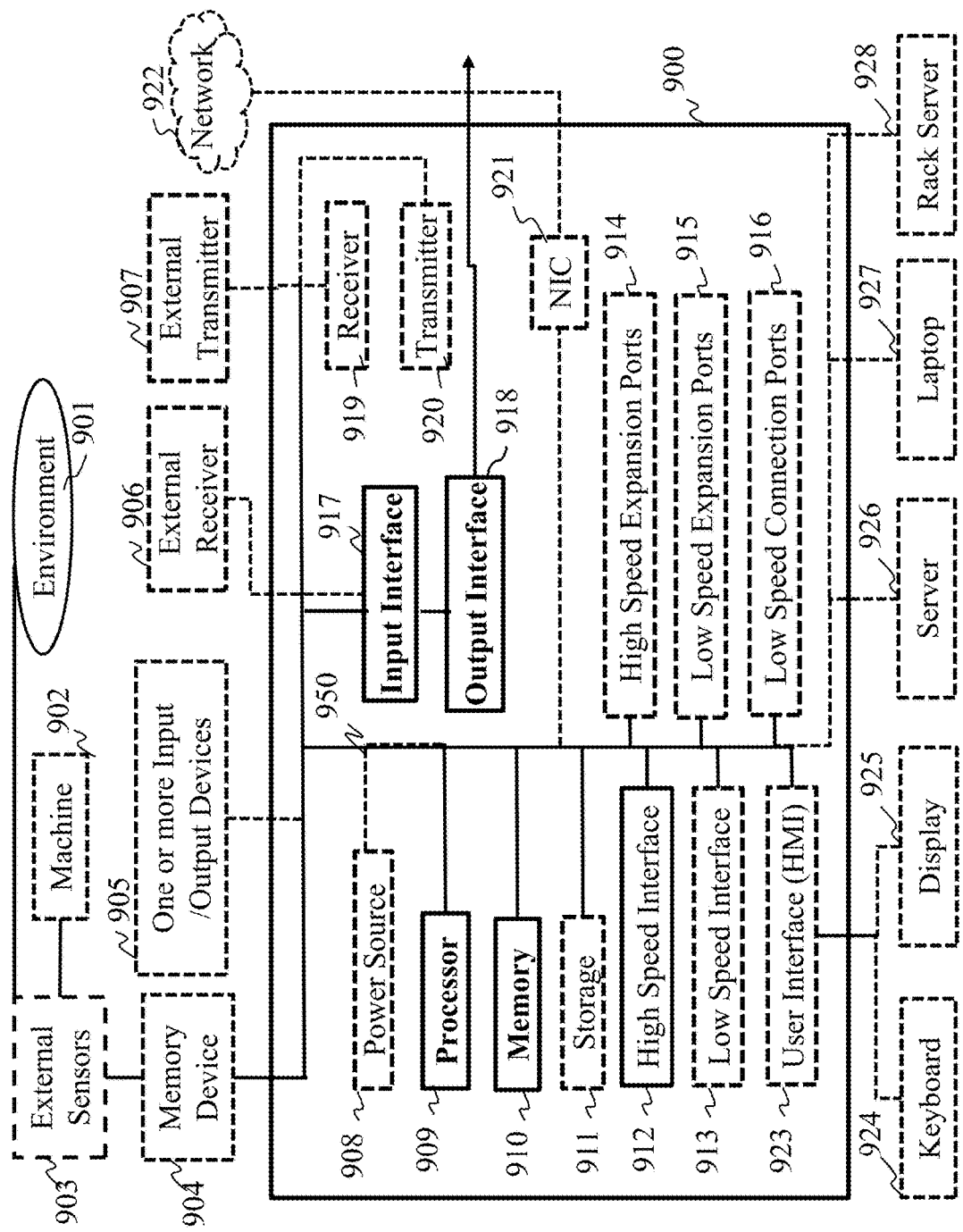
FIG. 9 is a schematic illustrating by non-limiting example a computing apparatus for implementing some techniques of the methods and systems, according to some example embodiments.

FIG. 9 is a schematic illustrating by non-limiting example a computing apparatus 900 that can be used to implement some techniques of the methods and systems, according to embodiments of the present disclosure. The computing apparatus or device 900 represents various forms of digital computers, such as laptops, desktops, workstations, personal digital assistants, servers, blade servers, mainframes, and other appropriate computers.

The computing device 900 can include a power source 908, a processor 909, a memory 910, a storage device 911, all connected to a bus 950. Further, a high-speed interface 912, a low-speed interface 913, high-speed expansion ports 1214 and low speed connection ports 915, can be connected to the bus 1250. In addition, a low-speed expansion port 916 is in connection with the bus 950. Contemplated are various component configurations that may be mounted on a common motherboard, by non-limiting example, 930, depending upon the specific application. Further still, an input interface 917 can be connected via bus 950 to an external receiver 906 and an output interface 918. A receiver 919 can be connected to an external transmitter 907 and a transmitter 920 via the bus 950. Also connected to the bus 950 can be an external memory 904, external sensors 903, machine(s) 902 and an environment 901. Further, one or more external input/output devices 905 can be connected to the bus 950. A network interface controller (NIC) 921 can be adapted to connect through the bus 950 to a network 922, wherein data or other data, among other things, can be rendered on a third party display device, third party imaging device, and/or third party printing device outside of the computer device 900.

Still referring to FIG. 9, contemplated is that the memory 910 can store instructions that are executable by the computer device 900, historical data, and any data that can be utilized by the methods and systems of the present disclosure. The memory 910 can include random access memory (RAM), read only memory (ROM), flash memory, or any other suitable memory systems. The memory 910 can be a volatile memory unit or units, and/or a non-volatile memory unit or units. The memory 910 may also be another form of computer-readable medium, such as a magnetic or optical disk.

A storage device 911 can be adapted to store supplementary data and/or software modules used by the computer device 900. For example, the storage device 911 can store historical data and other related data as mentioned above regarding the present disclosure. Additionally, or alternatively, the storage device 911 can store historical data similar to data as mentioned above regarding the present disclosure. The storage device 911 can include a hard drive, an optical drive, a thumb-drive, an array of drives, or any combinations thereof. Further, the storage device 911 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 909), perform one or more methods, such as those described above.

Still referring to FIG. 9, the system can be linked through the bus 950 optionally to a display interface or user Interface (HMI) 923 adapted to connect the system to a display device 925 and keyboard 924, wherein the display device 925 can include a computer monitor, camera, television, projector, or mobile device, among others.

The computer device 900 can include a user input interface 917 adapted to a printer interface (not shown) can also be connected through bus 950 and adapted to connect to a printing device (not shown), wherein the printing device can include a liquid inkjet printer, solid ink printer, large-scale commercial printer, thermal printer, UV printer, or dye-sublimation printer, among others.

Still referring to FIG. 9, the high-speed interface 912 manages bandwidth-intensive operations for the computing device 900, while the low-speed interface 913 manages lower bandwidth-intensive operations. Such allocation of functions is an example only. In some implementations, the high-speed interface 912 can be coupled to the memory 910, a user interface (HMI) 923, and to a keyboard 924 and display 925 (e.g., through a graphics processor or accelerator), and to the high-speed expansion ports 914, which may accept various expansion cards (not shown) via bus 950. In the implementation, the low-speed interface 913 is coupled to the storage device 911 and the low-speed expansion port 915, via bus 950. The low-speed expansion port 915, which may include various communication ports (e.g., USB, Bluetooth, Ethernet, wireless Ethernet) may be coupled to one or more input/output devices 905, and other devices a keyboard 924, a pointing device (not shown), a scanner (not shown), or a networking device such as a switch or router, e.g., through a network adapter.

The computing device 900 may be implemented in a number of different forms, as shown in the figure. For example, it may be implemented as a standard server 926, or multiple times in a group of such servers. In addition, it may be implemented in a personal computer such as a laptop computer 927. It may also be implemented as part of a rack server system 928. Alternatively, components from the computing device 900 may be combined with other components in a mobile device (not shown). Each of such devices may contain one or more of the computing device and the mobile computing device, and an entire system may be made up of multiple computing devices communicating with each other.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A controller for maintaining a spacecraft near an orbit, the controller comprising:
    a memory configured to store executable instructions; and
    a processor configured to execute the executable instructions to cause the controller to:
        detect that a distance from the spacecraft to the orbit is greater than a spacecraft threshold;
        in response to detecting that the distance from the spacecraft to the orbit is greater than the spacecraft threshold:
            linearize dynamics of the spacecraft from a current time over a time horizon with respect to a high fidelity reference trajectory to produce a state transition matrix (STM) for an uncontrolled motion of the spacecraft within the time horizon, wherein the state transition matrix includes non-expanding eigenvectors with magnitudes less than or equal to one and expanding eigenvectors with magnitudes greater than one;
            determine a control action that changes an upcoming state of the spacecraft to a linear combination of the non-expanding eigenvectors of the state transition matrix; and
            generate a control command to an actuator of the spacecraft causing correction of the upcoming state of the spacecraft along a direction corresponding to at least one of the non-expanding eigenvectors of the state transition matrix.

2. The controller of claim 1, wherein to detect that the distance is greater than the spacecraft threshold, the processor is configured to:
    determine a current state of the spacecraft within a specified time period; and
    determine a distance between a location governed by the current state of the spacecraft and the orbit; and
    compare the determined distance between the location governed by the current state of the spacecraft and the orbit with the spacecraft threshold.

3. The controller of claim 2,
    wherein the specified time period is outside the time horizon, and
    wherein to determine the current state of the spacecraft, the processor is further configured to obtain measurements corresponding to one or a combination of positions and translational velocities of the spacecraft, and perturbations acting on a multi-object celestial system defined by the spacecraft and at least one celestial object.

4. The controller of claim 1, wherein, to determine the state transition matrix, the processor is further configured to obtain a linear model of a dynamical system defined by the spacecraft and at least one celestial object;

compute discrete time update of perturbations of the high fidelity reference trajectory; and propagate a numerical expression defined by the high fidelity reference trajectory and elementary basis vectors for the STM over a defined time period.

5. The controller of claim 1, wherein the processor is further configured to obtain a different spacecraft threshold for a visitor spacecraft to perform eigenvector-based control of motion of the visitor spacecraft using the high fidelity reference trajectory.

6. The controller of claim 1, wherein to determine the control action the processor is further configured to determine the direction of the correction of the upcoming state by linear combination of a direction of each non-expanding eigenvector of the STM to achieve a mixed state with natural motion that is a combination of corresponding eigenmotion of each non-expanding eigenvector of the STM.

7. The controller of claim 1, wherein, to generate the control command, the processor is further configured to solve a nonlinear optimization problem to find a fuel-efficient maneuver that transfers the spacecraft to a set of desirable states that yield desirable natural motion.

8. The controller of claim 7, wherein the nonlinear optimization problem is directed towards a finite horizon optimization of a model of the spacecraft, a set of objectives of motion of the spacecraft, and constraints on a propulsion system of the spacecraft and the motion of the spacecraft.

9. The controller of claim 8, wherein the constraints on the propulsion system of the spacecraft and the motion of the spacecraft include one or more physical limitations of the spacecraft, one or more safety limitations on operation of the spacecraft, and one or more performance limitations on a trajectory of the spacecraft.

10. The controller of claim 1, wherein the spacecraft is configured to execute a task of docking to a space station that maintains its position near the orbit at a distance smaller than a station threshold, wherein the controller is further configured to select the spacecraft threshold greater than the station threshold.

11. The controller of claim 1, wherein the upcoming state of the spacecraft includes one or combination of positions, orientations, and translational and angular velocities of one or more of the spacecraft and a payload of the spacecraft, and perturbations acting on a multi-object celestial system defined by the spacecraft, the payload, and one or more celestial objects.

12. The controller of claim 11, wherein the perturbations acting on the multi-object celestial system are natural orbital forces that include solar and lunar gravitational perturbations, anisotropic gravitational perturbations due to a central body's nonsphericity, solar radiation pressure, and air drag.

13. The controller of claim 1, wherein the high-fidelity reference trajectory is an uncontrolled, natural motion trajectory which lies near a near-rectilinear halo orbit (NRHO) in an Earth-Moon circular-restricted three-body problem, and is estimated using multiple shooting approach.

14. The controller of claim 13, wherein the high-fidelity reference trajectory comprises a finite number of aperiodic revolutions around Moon over a finite number of days.

15. The controller of claim 1, wherein the orbit is one of a circular orbit, an elliptic orbit, a halo orbit, a near rectilinear halo orbit, or a quasi-satellite orbit.

16. The controller of claim 1, wherein the control command is generated as a solution to a model predictive control policy that produces the control command by optimizing a cost function over a receding horizon.

17. The controller of claim 16, wherein the cost function includes a stabilization component for directing a movement of the spacecraft to the upcoming state, a component for an objective of an operation of the spacecraft, and a performance component for optimizing the movement of the spacecraft until the upcoming state is achieved.

18. The controller of claim 1, wherein the control command is generated for each specified time period of multiple specified time periods in the time horizon, or generated iteratively over a receding time-horizon.

19. A computer-implemented method for maintaining a spacecraft near an orbit, comprising:

detecting that a distance from the spacecraft to the orbit is greater than a spacecraft threshold;

in response to detecting that the distance from the spacecraft to the orbit is greater than the spacecraft threshold:

linearizing dynamics of the spacecraft from a current time over a time horizon with respect to a high fidelity reference trajectory to produce a state transition matrix (STM) for an uncontrolled motion of the spacecraft within the time horizon, wherein the state transition matrix includes non-expanding eigenvectors with magnitudes less than or equal to one and expanding eigenvectors with magnitudes greater than one;

determining a control action that changes an upcoming state of the spacecraft to a linear combination of the non-expanding eigenvectors of the state transition matrix; and generating a control command to an actuator of the spacecraft causing correction of the upcoming state of the spacecraft along a direction corresponding to at least one of the non-expanding eigenvectors of the state transition matrix.

20. A non-transitory computer readable storage medium having embodied thereon a program executable by a processor for performing a method for maintaining a spacecraft near an orbit, the method comprising:

detecting that a distance from the spacecraft to the orbit is greater than a spacecraft threshold;

in response to detecting that the distance from the spacecraft to the orbit is greater than the spacecraft threshold:

linearizing dynamics of the spacecraft from a current time over a time horizon with respect to a high fidelity reference trajectory to produce a state transition matrix (STM) for an uncontrolled motion of the spacecraft within the time horizon, wherein the state transition matrix includes non-expanding eigenvectors with magnitudes less than or equal to one and expanding eigenvectors with magnitudes greater than one;

determining a control action that changes an upcoming state of the spacecraft to a linear combination of the non-expanding eigenvectors of the state transition matrix; and generating a control command to an actuator of the spacecraft causing correction of the upcoming state of the spacecraft along a direction corresponding to at least one of the non-expanding eigenvectors of the state transition matrix.

* * * * *